US012655330B2

(12) United States Patent
Egli et al.

(10) Patent No.: US 12,655,330 B2
(45) Date of Patent: Jun. 16, 2026

(54) ACOUSTIC ADHESIVE COMPOSITION AND LAMINATED BUILDING BOARD INCLUDING SAME

(71) Applicant: CertainTeed Gypsum, Inc., Malvern, PA (US)

(72) Inventors: Emma Egli, Waltham, MA (US); Nicky Chan, Northborough, MA (US); Melissa Monello, Waltham, MA (US); Choung-Houng Lai, Acton, MA (US); Aldo Glean, Framingham, MA (US); James N. Gordon, Waban, MA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 277 days.

(21) Appl. No.: 18/521,242

(22) Filed: Nov. 28, 2023

(65) Prior Publication Data

US 2024/0174903 A1    May 30, 2024

Related U.S. Application Data

(60) Provisional application No. 63/385,236, filed on Nov. 29, 2022.

(30) Foreign Application Priority Data

Jan. 23, 2023   (EP) ..................................... 23152809

(51) Int. Cl.
*C09J 133/08*       (2006.01)
*C09J 11/08*        (2006.01)
(52) U.S. Cl.
CPC ............. *C09J 133/08* (2013.01); *C09J 11/08* (2013.01); *C09J 2301/312* (2020.08); *C09J 2301/408* (2020.08)

(58) Field of Classification Search
CPC .... C09J 133/08; C09J 11/08; C09J 2301/312; C09J 2301/408
See application file for complete search history.

(56) References Cited

U.S. PATENT DOCUMENTS

| | | | |
|---|---|---|---|
| 5,264,467 A | 11/1993 | DeStefano | |
| 6,289,646 B1 | 9/2001 | Watanabe | |

(Continued)

FOREIGN PATENT DOCUMENTS

| | | | |
|---|---|---|---|
| JP | 2016-154108 A | 8/2016 | |
| JP | 2020-026639 A | 2/2020 | |

(Continued)

OTHER PUBLICATIONS

International Search Report and Written Opinion in International Patent Application PCT/US2023/081316, dated Mar. 21, 2024.

*Primary Examiner* — Forrest M Phillips
(74) *Attorney, Agent, or Firm* — McDonnell Boehnen Hulbert & Berghoff LLP

(57) ABSTRACT

In one aspect, the present disclosure relates generally to a set acoustic adhesive composition having a storage modulus at 20° C. of at least 2.0 MPa over a frequency of 1-10 kHz, the set acoustic adhesive composition comprising: a continuous phase of a viscoelastic material present in an amount in the range of 60-95 wt % of the set adhesive composition; and dispersed in the continuous phase, a particulate polymer filler present in an amount in the range of 5-40 wt % of the set adhesive composition, wherein the particulate polymer filler has a storage modulus at 20° C. of at least 50 times a storage modulus at 20° C. of the continuous phase at 20° C., over a frequency of 1-10 kHz; and/or the viscoelastic material of the continuous phase has a glass transition temperature ($T_g$) no greater than 0° C., and the particulate polymer filler has a glass transition temperature ($T_g$) of at least 60° C.

21 Claims, 11 Drawing Sheets

(56)                References Cited

U.S. PATENT DOCUMENTS

| | | | |
|---|---|---|---|
| 7,795,343 B2 | 9/2010 | Alderfer | |
| 7,921,965 B1 * | 4/2011 | Surace | E04B 9/045 |
| | | | 181/290 |
| 8,181,738 B2 | 5/2012 | Tinianov | |
| 8,931,230 B2 | 1/2015 | Negri | |
| 9,140,015 B2 | 9/2015 | Negri | |
| 9,169,426 B2 | 10/2015 | Negri | |
| 9,365,455 B2 | 6/2016 | Hargrove | |
| 9,387,649 B2 | 7/2016 | Tinianov | |
| 9,388,568 B2 | 7/2016 | Tinianov | |
| 11,753,817 B2 * | 9/2023 | Shi | B32B 5/18 |
| | | | 181/290 |
| 2001/0011443 A1 | 8/2001 | Watanabe | |
| 2005/0118383 A1 * | 6/2005 | Cargill | A61F 7/02 |
| | | | 428/36.1 |
| 2006/0053713 A1 | 3/2006 | Remin | |
| 2008/0264721 A1 * | 10/2008 | Tinianov | E04B 1/86 |
| | | | 181/290 |
| 2010/0206663 A1 | 8/2010 | Payot | |
| 2010/0230206 A1 | 9/2010 | Tinianov | |
| 2011/0165429 A1 | 7/2011 | Tinianov | |
| 2012/0052274 A1 | 3/2012 | Rehfeld | |
| 2015/0010735 A1 | 1/2015 | Okada | |
| 2018/0073246 A1 | 3/2018 | Ullet | |
| 2020/0001405 A1 * | 1/2020 | Murphy | B32B 15/095 |
| 2020/0056073 A1 | 2/2020 | Hulteen | |
| 2021/0170727 A1 * | 6/2021 | Bulloni | B32B 7/06 |
| 2021/0172174 A1 * | 6/2021 | Ackermann | B32B 27/28 |
| 2021/0179506 A1 | 6/2021 | Teng | |

FOREIGN PATENT DOCUMENTS

| | | |
|---|---|---|
| WO | 2022186316 A1 | 9/2022 |
| WO | 2023031430 A1 | 3/2023 |
| WO | 2023031433 A1 | 9/2023 |

* cited by examiner

ACOUSTIC ADHESIVE COMPOSITION AND LAMINATED BUILDING BOARD INCLUDING SAME

CROSS-REFERENCE TO RELATED APPLICATIONS

This application claims the benefit of priority of U.S. Provisional Patent Application No. 63/385,236, filed Nov. 29, 2022, and European Patent Application no. 23152809.2, filed Jan. 23, 2023, each of which is hereby incorporated herein by reference in its entirety.

FIELD

The present disclosure relates generally to acoustic adhesive compositions and products containing the same. In particular, the acoustic adhesive composition is useful in providing acoustic dampening properties to laminated building boards. Additionally, the disclosure relates to methods of making acoustic adhesive formulations and methods of making products containing the same.

TECHNICAL BACKGROUND

Plaster building boards, often called "sheet rock" or "drywall", are typically used to construct walls within homes, businesses, or other buildings. Plaster boards are typically made of gypsum, but other materials, including lime and cement, are also used.

Currently, soundproofing is becoming an ever-increasing concern for the construction industry, for example, for use in residences, hotels, schools and hospitals. Soundproofing is also desirable in the construction of theaters and music studios, to insulate noise made in those areas from surrounding rooms. Model building codes and design guidelines often specify minimum Sound Transmission Class values for wall structures within buildings. While a number of construction techniques have been used to address the problem of soundproofing, one especially desirable technique uses sound-dampening building boards that can be used in place of conventional drywall boards various residential or commercial structures.

A sound-dampening building board typically includes a damping layer having viscoelastic properties disposed between two layers of hard building board material, typically a hardened plaster. The damping layer is desirably sufficiently rigid such that when the building board is scored with a knife then "snapped," the polymer will fracture in a clean line such that the entire layered structure breaks cleanly. However, this combination of properties—sound dampening and score-and-snap performance—can be difficult to achieve.

Accordingly, what are needed are improved acoustic adhesive compositions that provide good acoustic performance, while maintaining the "score and snap" abilities of a building board.

SUMMARY

One aspect of the present disclosure as described herein provides a set acoustic adhesive composition having a storage modulus at 20° C. of at least 2.0 MPa over a frequency of 1-10 kHz, the set acoustic adhesive composition comprising:

a continuous phase of a viscoelastic material having a glass transition temperature ($T_g$) no greater than 0° C.

present in an amount in the range of 60-95 wt % of the set acoustic adhesive composition; and dispersed in the continuous phase, a particulate polymer filler having a glass transition temperature ($T_g$) greater than 60° C. present in an amount in the range of 5-40 wt % of the set acoustic adhesive composition.

Another aspect of the present disclosure as described herein provides a liquid acoustic adhesive formulation, e.g., suitable for providing a set acoustic adhesive composition as described herein, the liquid acoustic adhesive formulation comprising an aqueous dispersion of:

one or more components suitable to provide a continuous phase of a viscoelastic material having a glass transition temperature ($T_g$) no greater than 0° C. present in an amount in the range of 60-95 wt % on a dry solids basis; and a particulate polymer filler having a glass transition temperature ($T_g$) greater than 60° C. present in an amount in the range of 5-40 wt %, on a dry solids basis.

Another aspect of the present disclosure provides a set acoustic adhesive composition having a storage modulus at 20° C. of at least 2.0 MPa over a frequency of 1-10 kHz, the set acoustic adhesive composition comprising:

a continuous phase of a viscoelastic material present in an amount in the range of 60-95 wt % of the set acoustic adhesive composition; and dispersed in the continuous phase, a particulate polymer filler present in an amount in the range of 5-40 wt % of the set acoustic adhesive composition, wherein the particulate polymer filler has a storage modulus at 20° C. over a frequency of 1-10 kHz of at least 50 times a storage modulus at 20° C. of the continuous phase at 20° C. over a frequency of 1-10 kHz.

Another aspect of the present disclosure as described herein provides a liquid acoustic adhesive formulation, e.g., suitable for providing a set acoustic adhesive composition as described herein, the liquid acoustic adhesive formulation comprising an aqueous dispersion of:

one or more components suitable to provide a continuous phase of a viscoelastic material, present in an amount in the range of 60-95 wt % on a dry solids basis; and a particulate polymer filler present in an amount in the range of 5-40 wt %, on a dry solids basis, wherein the particulate polymer filler has a storage modulus at 20° C. over a frequency of 1-10 kHz of at least 50 times a storage modulus at 20° C. of the continuous phase at 20° C. over a frequency of 1-10 kHz.

Another aspect of the present disclosure as described herein provides a sound-dampening building board comprising:

a first plaster layer having a top surface and a bottom surface;

a second plaster layer having a top surface and a bottom surface; and the set acoustic adhesive composition as described herein disposed between the top surface of the first plaster layer and the bottom surface of the second plaster layer.

Another aspect of the present disclosure as described herein provides for a method for making the sound-dampening building board as described herein comprising:

providing the first plaster layer having a top surface and a bottom surface and the second plaster layer having a top surface and a bottom surface;

disposing the liquid acoustic adhesive formulation as described herein between the top surface of the first plaster layer and the bottom surface of the second plaster layer; and 3                                                          4 allowing the liquid acoustic adhesive formulation to set to provide the set acoustic adhesive composition.

DETAILED DESCRIPTION

Figure 1:
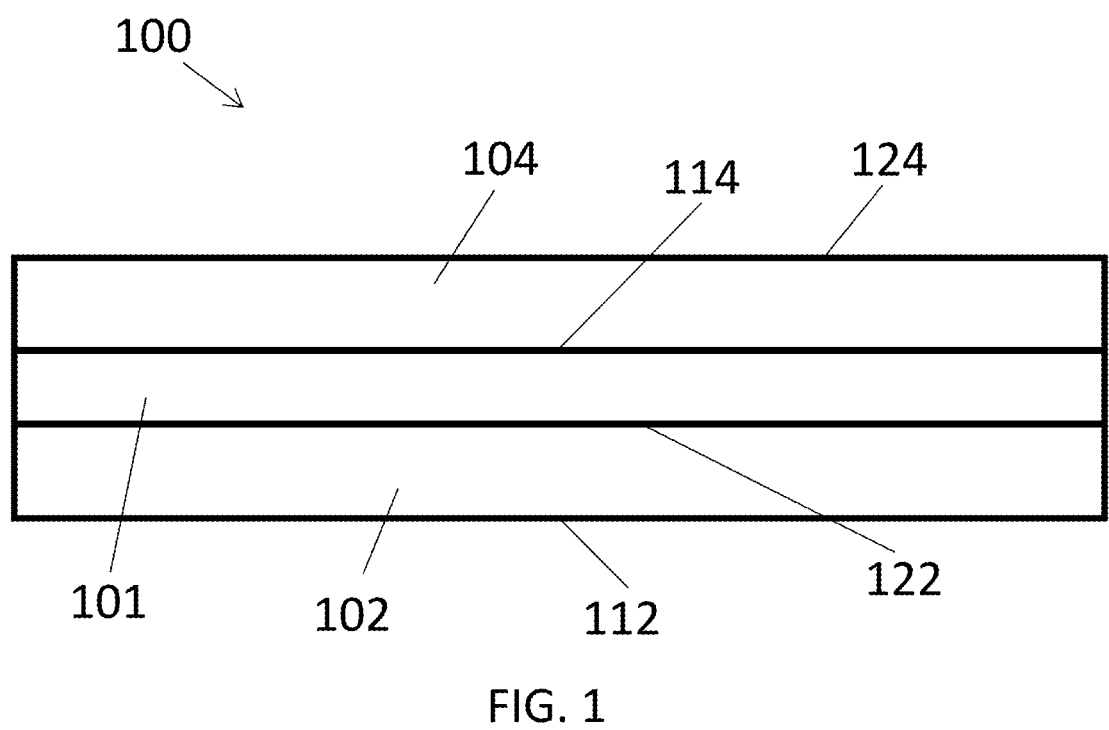
FIG. 1 is an illustration of a sound-dampening building board as described herein.

The present disclosure is concerned with acoustic adhesive compositions (both in set and liquid forms) that are particularly useful in sound-dampening building boards. The present inventors have noted that typical acoustic adhesives used in sound-dampening boards include a mineral filler that increases the stiffness of the glue to enable the desired "score and snap" property of the board while also reducing costs. However, especially in the context of materials provided as aqueous dispersions, the mineral filler poses a variety of processing challenges, as it has to be blended into the glue and tends to settle out of the dispersion over time. As such, the present inventors have noted a need to provide improved acoustic adhesive compositions.

The present inventors have found that use of a relatively hard particulate polymer filler in combination with a relatively soft polymeric continuous phase can provide improved performance. Thus, in one aspect, the present disclosure provides a set acoustic adhesive composition having a continuous phase and dispersed in that continuous phase, a particulate polymer filler. The set acoustic adhesive composition has a storage modulus at 20° C. of at least 2.0 MPa over a frequency of 1-10 kHz. As used herein, a set acoustic adhesive composition having a storage modulus at 20° C. of at least 2.0 MPa over a frequency of 1-10 kHz indicates that the material has at least one value of the storage modulus within the range of 1-10 kHz of at least 2 MPa.

As described above, in one aspect of the disclosure, the continuous phase of the viscoelastic material has a glass transition temperature ($T_g$) no greater than 0° C. In some embodiments, the continuous phase of the viscoelastic material has a glass transition temperature ($T_g$) no greater than −10° C., or no greater than −15° C., or no greater than −20° C. For example, in various embodiments, the continuous phase of the viscoelastic material has a glass transition temperature ($T_g$) in the range of −60 to 0° C. (e.g., in the range of −60 to −10° C., or −60 to −15° C., or −60 to −20° C., or −50 to 0° C., or −50 to −10° C., or −50 to −15° C., or −50 to −20° C., or −40 to 0° C., or −40 to −10° C., or −40 to −15° C., or −40 to −20° C.).

In various embodiments, the continuous phase of the viscoelastic material lacks a glass transition temperature in excess of 20° C. The present inventors note that in the compositions described herein, the continuous phase provides viscoelastic damping of vibration and thus acts to damp sound in the building boards described herein. As such, it is desirable for the continuous phase be in a rubbery phase.

As described above, in one aspect of the disclosure, the particulate polymer filler has a glass transition temperature ($T_g$) of at least 60° C. In some embodiments, the particulate polymer filler has a glass transition temperature ($T_g$) of at least 70° C., e.g., at least 80° C., or at least 90° C. For example, in various embodiments, the particulate polymer filler has a glass transition temperature ($T_g$) in the range of 60-175° C., e.g., 70-175° C., or 80-175° C., or 90-175° C., or 60-150° C., or 70-150° C., or 80-150° C., or 90-150° C., or 60-125° C., or 70-125° C., or 80-125° C., or 90-125° C.

And in various embodiments, the particulate polymer filler lacks a glass transition temperature of less than 40° C. The present inventors have noted that it is desirable for a particulate polymer filler to be relatively hard and stiff, in order to provide desired properties to the composite with the relatively soft and flexible continuous polymer phase.

In some embodiments of the disclosure as described herein, the particulate filler has a storage modulus at 20° C. that is greater than the storage modulus at 20° C. of the continuous phase of the viscoelastic material. This difference in storage modulus ultimately modifies the overall storage modulus of the composition to provide a set acoustic adhesive with a desired storage modulus at 20° C., e.g., as described herein. For example, in some embodiments the particulate polymer filler has a storage modulus at 20° C. of at least 50 times a storage modulus at 20° C. of the continuous phase at 20° C., over a frequency of 1-10 kHz (e.g., over a frequency of 1-8 kHz, or 1-6 kHz, or 1-4 kHz).

Indeed, another aspect of the disclosure provides a set acoustic adhesive composition having a storage modulus at 20° C. of at least 2.0 MPa over a frequency of 1-10 kHz, the set acoustic adhesive composition comprising:

a continuous phase of a viscoelastic material present in an amount in the range of 60-95 wt % of the set acoustic adhesive composition; and dispersed in the continuous phase, a particulate polymer filler present in an amount in the range of 5-40 wt % of the set acoustic adhesive composition, wherein the particulate polymer filler has a storage modulus at 20° C. over a frequency of 1-10 kHz of at least 50 times a storage modulus at 20° C. of the continuous phase at 20° C., over a frequency of 1-10 kHz (e.g., over a frequency of 1-8 kHz, or 1-6 kHz, or 1-4 kHz). Such a material, in some embodiments, can meet the $T_g$ limitations described above.

In various embodiments, the particulate polymer filler has a storage modulus at 20° C. over a frequency of 1-10 kHz that is at least 100 times, e.g., at least $10^3$ times, or at least $10^4$ times a storage modulus at 20° C. of the continuous phase of the viscoelastic material, over a frequency of 1-10 kHz (e.g., over a frequency of 1-8 kHz, or 1-6 kHz, or 1-4 kHz).

In various embodiments as otherwise described herein, the particulate polymer filler has a storage modulus at 20° C. of at least 1000 MPa, e.g., at least 1500 MPa, over a frequency of 1-10 kHz (e.g., over a frequency of 1-8 kHz, or 1-6 kHz, or 1-4 kHz). For example, in various embodiments, the particulate polymer filler has a storage modulus at 20° C. in the range of 1000 to 5000 MPa, e.g., in the range of 1000 to 4000 MPa, or 1000 to 3000 MPa, or 1500 to 5000 MPa, or 1500 to 3000 MPa, over a frequency of 1-10 kHz (e.g., over a frequency of 1-8 kHz, or 1-6 kHz, or 1-4 kHz).

In various embodiments as otherwise described herein, the continuous phase of the viscoelastic material has a storage modulus at 20° C. of no more than 1 MPa, e.g., no more than 0.5 MPa or no more than 0.2 MPa, over a frequency of 1-10 kHz (e.g., over a frequency of 1-8 kHz, or 1-6 kHz, or 1-4 kHz). in the range of 0.01 to 1 MPa, e.g., in the range of 0.01 to 0.5 MPa, or 0.01 to 0.2 MPa, or 0.1 to 1 MPa, or 0.1 to 0.5 MPa, or 0.1 to 0.2 MPa, over a frequency of 1-10 kHz (e.g., over a frequency of 1-8 kHz, or 1-6 kHz, or 1-4 kHz).

The set acoustic adhesive of the present disclosure as described herein has viscoelastic properties. As would be understood by the person of skill in the art, the viscoelasticity of a material can be measured by determining the rheological behavior of the material. Such measurements can include determining the shear storage modulus (G'), the shear loss modulus (G"), and the Tan δ. As used herein, unless otherwise noted the "storage modulus" is the shear storage modulus (G') and represents the elastic properties of the material. The storage modulus represents the energy stored in the elastic structure of the sample and as such, provides information as to the amount of structure the material exhibits. As used herein, unless otherwise noted the "loss modulus" is the shear loss modulus (G") and represents the viscous properties of the material. The loss modulus represents the amount of energy dissipated in the sample and is related to the materials ability to dissipate stress through heat. Accordingly, if the storage modulus is greater than the loss modulus, the material is regarded as being mainly elastic, and if the loss modulus is greater than the storage modulus, then the material is regarded as being mainly viscous. To quantify the relative viscous and elastic properties of the materials, the Tan δ is calculated as the ratio of the loss modulus to the storage modulus (i.e., G"/G'). The Tan δ height is the maximum value of the Tan δ over the range of $10^{-3}$-$10^6$ Hz (e.g., in the range of 0.1-10 kHz, or 0.5-10 kHz, or 1-10 kHz, or 1-8 kHz, or 1-6 kHz, or 1-4 kHz)

As used herein, the storage modulus (i.e., shear storage modulus, G'), loss modulus (i.e., shear loss modulus, G"), and Tan δ are determined using dynamic mechanical analysis (DMA), which is a measurement of the material subjected to sinusoidal stress and strain. The DMA instrument makes it possible to subject the material to deformations under precise conditions of temperature and frequency, and to measure the displacements of the specimen, the forces applied to the material and their phase shift, which makes it possible to measure rheological quantities characterizing the material. Specifically, a parallel plate rheometer using an 8 mm parallel plate geometry on a Discovery Series Hybrid Rheometer (DHR) from TA Instruments was used to provide the measurements described in this application. Samples were prepared by stacking multiple layers of the material under test to create a test specimen thick enough to fill the rheometer gap of 1 mm. More rigid specimens are typically laminated between release films and punched into discs. Softer samples can be compressed into disc shape by the rheometer to fill the gap. Frequency sweep tests with frequency from 0.1 to 100 rad/s were performed at 10° C. increments from 40° C. to −30° C., with shear strain at 1% and auto-strain adjustment enabled to prevent torque from exceeding 1.0 mN. Normal force adjustment was enabled to maintain a normal force between +1.0 N and −1.0 N to compensate for thermal expansion/contraction of the sample and fixtures. Frequency sweeps (from 0.1 to 100 rad/s) were performed at 10° C. increments from 40° C. to −30° C. The frequencies sweeps obtained at each temperature were then shifted using the Williams-Landel-Ferry (WLF) model to obtain a master curve showing G', G", and Tan δ over a broad range of frequencies using the time-temperature superposition principle. The person of ordinary skill in the art can provide equivalent testing procedures with different DMA analysis instruments.

The continuous phase can be tested similarly. Particulate polymer fillers can be measured with reference to film specimens of the same polymers.

The present inventors have found that it can be particularly advantageous for the set acoustic adhesive composition to have a storage modulus at 20° C., as described above, of at least 2.0 MPa over a frequency of 1-10 kHz (e.g., over a frequency of 1-8 kHz, or 1-6 kHz, or 1-4 kHz). In some embodiments of the disclosure as described herein, the set acoustic adhesive composition has a storage modulus at 20° C. of at least 2.5 MPa, or at least 3.0 MPa, or at least 3.5 MPa, or at least 4.0 MPa, over a frequency of 1-10 kHz (e.g., over a frequency of 1-8 kHz, or 1-6 kHz, or 1-4 kHz). For example, in various embodiments, the set acoustic adhesive composition has a storage modulus at 20° C. in the range of 2.0 MPa to 6.0 MPa, or 2.5 MPa to 6.0 MPa, or 3.0 MPa to 6.0 MPa, or 3.5 MPa to 6.0 MPa, or 4.0 MPa to 6.0 MPa, or 2.0 MPa to 5.5 MPA, or 2.5 MPa to 5.5 MPa, or 3.0 MPa to 5.5 MPa, or 3.5 MPa to 5.5 MPa, or 4.0 MPa to 5.5 MPa, or 2.0 MPa to 5.0 MPa, or 2.5 MPa to 5.0 MPa, or 3.0 MPa to 5.0 MPa, or 3.5 MPa to 5.0 MPa, or 4.0 MPa to 5.0 MPa, over a frequency of 1-10 kHz (e.g., over a frequency of 1-8 kHz, or 1-6 kHz, or 1-4 kHz).

In some embodiments, the set acoustic adhesive composition has a loss modulus at 20° C., as described above, of at least 3.0 MPa, e.g., at least 3.5 MPa, or at least 4.0 MPa, or at least 4.5 MPa, over a frequency of 1-10 kHz (e.g., over a frequency of 1-8 kHz, or 1-6 kHz, or 1-4 kHz). For example, in various embodiments of the disclosure as described herein, the set acoustic adhesive composition has a loss modulus at 20° C. in the range of 3.0 MPa to 7.0 MPa, or 3.5 MPa to 7.0 MPa, or 4.0 MPa to 7.0 MPa, or 4.5 MPa to 7.0 MPa, or 3.0 MPa to 6.5 MPa, or 3.5 MPa to 6.5 MPa, or 4.0 MPa to 6.5 MPa, or 4.5 MPa to 6.5 MPa, or 3.0 MPa to 6.0 MPa, or 3.5 MPa to 6.0 MPa, or 4.0 MPa to 6.0 MPa, or 4.5 MPa to 6.0 MPa, over a frequency of 1-10 kHz (e.g., over a frequency of 1-8 kHz, or 1-6 kHz, or 1-4 kHz).

In some embodiments, the set acoustic adhesive composition has a Tan δ height, as described above, of at least 1 in the frequency range of 0.1-10 kHz. For example, in various embodiments, the set acoustic adhesive composition has a Tan δ height of at least 1 in the frequency range of 0.1-8 kHz, or 0.1-6 kHz, or 0.1-4 kHz, or 0.2-8 kHz, or 0.2-6 kHz, or 0.2-4 kHz. For example, in various embodiments, the set acoustic adhesive composition has a Tan δ height of at least 1 in the frequency range of 1-10 kHz, or 1-8 kHz, or 1-6 kHz, or 1-4 kHz, or 2-8 kHz, or 2-6 kHz, or 2-4 kHz. In some embodiments, the set acoustic adhesive composition has a Tan δ height in the range of 1-2 in the frequency range of 0.1-10 kHz. For example, in various embodiments, the set acoustic adhesive composition has a Tan δ height in the range of 1-2 in the frequency range of 0.1-8 kHz, or 0.1-6 kHz, or 0.1-4 kHz, or 0.2-8 kHz, or 0.2-6 kHz, or 0.2-4 kHz. For example, in various embodiments, the set acoustic adhesive composition has a Tan δ height in the range of 1-2 in the frequency range of 1-8 kHz, or 1-6 kHz, or 1-4 kHz, or 2-8 kHz, or 2-6 kHz, or 2-4 kHz.

These viscoelastic properties of the set acoustic adhesive composition are determined by the components that make up the compositions. As described above, the set acoustic adhesive composition includes a continuous phase of a viscoelastic material present in an amount in the range of 60-95 wt % of the set acoustic adhesive composition. In some embodiments, the continuous phase of the viscoelastic material is present in an amount in the range of 65-95 wt % of the set acoustic adhesive composition. For example, in various embodiments, the continuous phase of the viscoelastic material is present in the range of 70-95 wt %, or 75-95 wt %, or 80-95 wt % of the set acoustic adhesive composition. In some embodiments, the continuous phase of the viscoelastic material is present in an amount in the range of 60-90 wt % of the set acoustic adhesive composition. For example, in various embodiments, the continuous phase of the viscoelastic material is present in the range of 65-90 wt %, or 70-90 wt %, or 75-90 wt %, or 80-90 wt % of the set acoustic adhesive composition. In some embodiments, the continuous phase of the viscoelastic material is present in an amount in the range of 60-85 wt % of the set acoustic adhesive composition. For example, in various embodiments, the continuous phase of the viscoelastic material is present in the range of 65-85 wt %, or 70-85 wt %, or 75-85 wt %, or 60-80 wt %, or 65-80 wt %, or 70-80 wt %, or 75-80 wt % of the set acoustic adhesive composition.

The continuous phase of viscoelastic material can be based on a variety of polymer systems. For example, the present inventors note that a variety of elastomeric polymers can be adapted for use in continuous phase of viscoelastic material. A variety of acrylic elastomers are known, e.g., available as aqueous emulsions under the trade name RHOPLEX from Dow. But other elastomeric materials can be used.

In various embodiments, the elastomeric (e.g., acrylic) polymer is present in an amount of at least 50 wt % of the continuous phase of the viscoelastic material. For example, in some embodiments, the elastomeric (e.g., acrylic) polymer is present in an amount of at least 80 wt % (e.g., at least 85 wt %, or at least 90 wt %) of the continuous phase of the viscoelastic material. In some embodiments, the elastomeric (e.g., acrylic) polymer is present in an amount in the range of 50-99 wt % of the continuous phase of the viscoelastic material, e.g., 80-99 wt %, or 85-99 wt %, or 90-99 wt %, or 50-98 wt %, or 80-98 wt %, or 85-98 wt %, or 90-98 wt %, or 50-95 wt %, or 80-95 wt %, or 85-95 wt %, or 50-90 wt %, or 80-90 wt %, or 50-80 wt %, or 50-70 wt %.

In some embodiments, the elastomeric polymer has a glass transition temperature ($T_g$) less than the continuous phase of the viscoelastic material, e.g., has a glass transition temperature of no greater than −10° C. For example, in various embodiments, the elastomeric polymer has a glass transition temperature (Tg) no greater than −20° C., or −25° C., or −30° C. In various embodiments, the acrylic polymer has a glass transition temperature in the range of −70 to −20° C., or −65 to −20° C., or −60 to −20° C., or −70 to −25° C., or −65 to −25° C., or −60 to −25° C., or −70 to −30° C., or −65 to −30° C., or −60 to −30° C.

A variety of other components may be present in the continuous phase of viscoelastic material, to adjust properties. For example, in various embodiments, the continuous phase further includes a tackifier. As the person of ordinary skill in the art will appreciate, a tackifier can be used to provide additional "tack," or stickiness to the material, to provide it improved adhesive properties. This can be desirable for systems in which the composition adheres together two plaster layers to form a sound-dampening building board. In various embodiments, the tackifier is present in an amount in the range of 1-20 wt %, or 5-20 wt %, or 5-15 wt %, or 5-10 wt %, or 10-20 wt %, or 10-15 wt %, or 10-12 wt %, of the liquid acoustic adhesive formulation, on a dry solids basis. The tackifier may be selected from a variety of tackifiers and is not particularly limited. For example, in some embodiments, the tackifier is a low molecular weight solid. The tackifier may comprise a rosin resin. The resin can comprise a glycerol ester of wood resin, preferably abietic acid. For example, in some embodiments, the tackifier is a rosin ester based tackifier (e.g., Dermulsene RE1513 from DRT).

In various embodiments, the continuous phase of the viscoelastic material further comprises a rheology modifier, e.g., to modify the rheology properties especially of a liquid formulation from which the composition is formed. In various embodiments, the rheology modifier is present in an amount in the range of 1-20 wt %, or 5-20 wt %, or 5-15 wt %, or 5-10 wt %, or 10-20 wt %, or 10-15 wt %, or 10-12 wt % of the adhesive composition. The rheology modifier may be selected from a variety of rheology modifiers and is not particularly limited. The rheology modifier may be used to increase the viscosity of the acoustic adhesive composition. For example, in some embodiments, the rheology modifier is a hydrophobically-modified alkali-swellable associative thickener (e.g., Acrysol TT-615, from Dow). In some embodiments, the rheology modifier is a cellulosic thickener (e.g., Walocel MW40000PFV, from Dow). In some embodiments as described herein the continuous phase of the viscoelastic material includes both a hydrophobically-modified alkali-swellable associative thickener and a cellulosic thickener.

In various desirable embodiments of the disclosure, the continuous phase of viscoelastic material is not substantially crosslinked. The present inventors have found that a non-crosslinked continuous phase can provide good viscoelastic properties to the overall set acoustic adhesive composition.

The particulate polymer filler may be selected from a variety of polymers having the desired glass transition temperature and/or storage modulus, and other desirable properties, and is not otherwise particularly limited. The person of ordinary skill in the art would be able to select an appropriate particulate polymer filler that has the properties as described herein. For example, in some embodiments, the particulate polymer filler retains its rigid, particle like structure at ambient temperatures which helps it act as reinforcing filler to the softer continuous phase of the viscoelastic material. In some embodiments, the particulate polymer filler is non-polar. In some embodiments, the particulate polymer filler is a styrene-based polymer, an acrylic-based polymer or an epoxy-based polymer. Copolymers, e.g., of styrene/acrylic and styrene/butadiene can be used. Examples include STYRON DL 218NA (styrene/butadiene) and LIGOS A3411 (styrene/acrylic).

As described above, the set acoustic adhesive composition includes a particulate polymer filler in an amount in the range of 5-40 wt % of the set acoustic adhesive composition. For example, in various embodiments, the particulate polymer filler is present in an amount in the range of 5-35 wt % (e.g., in the range of 5-30 wt %, or 5-25 wt %, or 5-20 wt %) of the set acoustic adhesive composition. In various embodiments, the particulate polymer filler is present in an amount in the range of 10-40 wt % (e.g., in the range of 10-35 wt %, or 10-30 wt %, or 10-25 wt %, or 10-20 wt %) of the set acoustic adhesive composition. In various embodiments, the particulate polymer filler is present in an amount in the range of 15-40 wt % (e.g., in the range of 15-35 wt %, or 15-35 wt %, or 15-30 wt %, or 15-25 wt %) of the set acoustic adhesive composition. In various embodiments, the particulate polymer filler is present in an amount in the range of 20-40 wt % (e.g., in the range of 20-35 wt %, wo-30 wt %, or 20-25 wt %) of the set acoustic adhesive composition.

The present inventors have determined that use of small particle size particulate polymer fillers can be especially advantageous for use in the materials described herein. For example, in various embodiments, the particulate polymer filler has a $d_{50}$ particle size of at least 50 nm (e.g., at least 75 nm, or at least 100 nm, or at least 125 nm). In various embodiments, the particulate polymer filler has a $d_{50}$ particle size in the range of 50-500 nm (e.g., in the range of 50-450 nm, or 50-400 nm, or 50-350 nm, or 50-300 nm, or 100-500 nm, or 100-450 nm, or 100-400 nm, or 100-350 nm, or 100-300 nm, or 150-500 nm, or 150-450 nm, or 150-400 nm, or 150-350 nm, or 150-300 nm). In various such embodiments, the particulate polymer filler has $d_{10}$ value of at least 10 nm (e.g., at least 25 nm, or at least 50 nm); and a $d_{90}$ value of no more than 1000 nm (e.g., no more than 750 nm, or no more than 500 nm).

The present inventors have found that using a particulate polymer filler that has a similar density to that of the continuous phase of viscoelastic material can be particularly advantageous. In particular, by having densities that are similar, the particulate polymer filler may be evenly dispersed throughout the continuous phase and prevents the particulate polymer filler from sinking or floating in the continuous phase. For example, in various embodiments the particulate filler has a density at 20° C. that is within 20% (e.g., within 15%, or within 10%) of a density at 20° C. of the continuous phase of viscoelastic material.

A variety of polymeric materials can be used as the particular polymer filler. For example, in various embodiments as otherwise described herein, the particulate polymer filler is a particulate polystyrene filler. But the present inventors have identified other materials can be used, such as epoxy resins and poly(meth)acrylates such as poly(methyl methacrylate). The person of ordinary skill in the art can, based on the disclosure herein, select other appropriate materials.

As described above, the set adhesive composition includes the continuous phase of viscoelastic material as described herein and the particulate polymer filler as described herein. The set acoustic adhesive composition may mostly consist of the continuous phase of the viscoelastic material and the particulate polymer filler. For example, in some embodiments, the continuous phase of the viscoelastic material and the particulate polymer filler together make up at least 90 wt % of the set acoustic adhesive composition. In various embodiments, the continuous phase of the viscoelastic material and the particulate polymer filler together make up at least 92 wt %, or at least 95 wt %, or at least 99 wt %, of the set acoustic adhesive composition.

In particular, the present inventors have found that the set acoustic adhesive including a particulate polymer filler does not have some of the drawbacks associated with use of a mineral filler. Namely, in various embodiments, the particulate polymer filler does not settle in the acoustic adhesive composition during storage or during long-term use of the material. As such, it can be advantageous for the set acoustic adhesive to have a low amount of minerals present. For example, in various embodiments, the set acoustic adhesive composition includes no more than 15 wt %, or no more than 10 wt %, or no more than 5 wt %, or no more than 1 wt %, or no more than 1 wt %, of a mineral filler.

The present inventors have determined that liquid formulations, especially aqueous formulations based on latexes and other emulsions, can be used to prepare layers of the set acoustic adhesive compositions of the disclosure. The present inventors have noted that the use of aqueous formulations can provide a variety of advantages from the standpoint of cost, environmental concerns, and manufacturing safety. Accordingly, other aspect of the present disclosure provides a liquid adhesive acoustic adhesive formulation, e.g., that is suitable for providing a set acoustic adhesive composition as described herein. As described above, the liquid acoustic adhesive formulation comprises an aqueous dispersion of one or more components suitable to provide the continuous phase of the viscoelastic material of the set acoustic adhesive composition, present in an amount in the range of 60-95 wt % on a dry solids basis; and the particulate polymer filler, present in an amount in the range of 5-40 wt %.

The one or more components may be provided in a variety of forms so long as they are suitable to provide the continuous phase as described herein. For example, in some embodiments, the one or more components are provided as an aqueous dispersion suitable to provide the continuous phase of the viscoelastic material as described herein. In some embodiments, the one or more components are present in an amount suitable to provide a continuous phase of a viscoelastic material as described herein. For example, in various embodiments, the one or more components suitable to provide a continuous phase of a viscoelastic material are present in any amount as described above with respect to the continuous phase of the set acoustic adhesive composition, on a dry solids basis.

In some embodiments, the one or more components includes an elastomeric polymer, e.g., an acrylic polymer. The acrylic polymer may be provided as an aqueous dispersion (e.g., a so-called "latex" or another emulsion). In some embodiments, the acrylic polymer may be present in an amount of at least 50 wt % of the components that form the continuous phase of the viscoelastic material, on a dry solids basis. In various embodiments the acrylic polymer is present in an amount of at least 80 wt %, or at least 85 wt %, or at least 90 wt %, of the components that form the continuous phase of the viscoelastic material, on a dry solids basis. The acrylic polymer may be present in various amounts of the liquid acoustic adhesive composition. For example, in some embodiments, the acrylic polymer is present in an amount of 32-90 wt % (e.g., or 35-90 wt %, or 35-85 wt %, or 35-80 wt %, or 35-75 wt %, or 40-90 wt %, or 40-85 wt %, or 40-80 wt %, or 40-75 wt %, or 45-90 wt %, or 45-85 wt %, or 45-80 wt %, or 45-75 wt %) of the liquid acoustic adhesive formulation, on a dry solids basis.

In some embodiments, the one or more components suitable to provide the continuous phase of the viscoelastic material have a wet density of at least 8 lbs/gal. For example, in various embodiments, the one or more components suitable to provide the continuous phase of the viscoelastic material have a wet density of at least 9 lbs/gal, or 10 lbs/gal, or 11 lbs/gal, or 12 lbs/gal.

In some embodiments as described herein, the liquid acoustic adhesive formulation further comprises a tackifier as described herein. The tackifier may be selected from a variety of tackifiers and is not particularly limited. For example, in some embodiments, the tackifier is a low molecular weight solid. The tackifier may comprise a rosin resin. The resin can comprise a glycerol ester of wood resin, preferably abietic acid. For example, in some embodiments, the tackifier is a rosin ester based tackifier (e.g., Dermulsene RE1513 from DRT). The tackifier can be present in any amount described above with respect to the continuous phase, on a dry solids basis.

In some embodiments as described herein, the liquid acoustic adhesive formulation further comprises a rheology modifier as described herein. The rheology modifier may be selected from a variety of rheology modifiers and is not particularly limited. The rheology modifier may be used to increase the viscosity of the acoustic adhesive composition. For example, in some embodiments, the rheology modifier is a hydrophobically-modified alkali-swellable associative thickener (e.g., Acrysol TT-615, from Dow). In some embodiments, the rheology modifier is a cellulosic thickener (e.g., Walocel MW40000PFV, from Dow). In some embodiments as described herein the continuous phase of the viscoelastic material includes both a hydrophobically-modified alkali-swellable associative thickener and a cellulosic thickener. The rheology modifier can be present in any amount described above with respect to the continuous phase, on a dry solids basis.

As described above, the liquid acoustic adhesive formulation also includes a particulate polymer filler as described herein. The particulate polymer filler may be provided in a variety of forms, for example, the particulate polymer filler may be provided as an aqueous dispersion. In some embodiments, the particulate polymer filler is present in an amount as described above with respect to the set acoustic adhesive composition, on a dry solids basis.

As described above, the liquid acoustic adhesive formulation includes one or more components suitable to provide the continuous phase of viscoelastic material as described herein and the particulate polymer filler as described herein. The liquid acoustic adhesive formulation may be mostly the one or more components suitable to provide the continuous phase of the viscoelastic material and the particulate polymer filler. For example, in some embodiments, the one or more components suitable to provide the continuous phase of the viscoelastic material and the particulate polymer filler together make up at least 90 wt %, or at least 92 wt %, or at least 95 wt %, or at least 99 wt %, of the liquid acoustic adhesive formulation, on a dry solids basis.

In particular, the present inventors have found that the liquid acoustic adhesive formulation including a particulate polymer filler does not have some of the drawbacks associated with use of a mineral filler. Namely, in various embodiments the particulate polymer filler does not settle in the liquid acoustic adhesive formulation during storage. As such, it can be advantageous for the liquid acoustic adhesive formulation to have a low amount of minerals present. For example, in various embodiments, the liquid acoustic adhesive formulation includes no more than 15 wt %, or no more than 10 wt %, or no more than 5 wt %, or no more than 2 wt %, or no more than 1 wt %, on a dry solids basis, of a mineral filler.

The person of ordinary skill in the art will, based on the disclosure herein, select a suitable solids content for the formulation, balancing the desire to have relatively low water content with a desire to have a workable material. In some embodiments, the liquid acoustic adhesive formulation has a solids content in the range of 40-70 wt %. For example, in some embodiments of the disclosure as described herein, the liquid acoustic adhesive formulation has a solids content in the range of 45-70 wt %, or 50-70 wt %, or 55-70 wt %, or 40-65 wt %, or 45-65 wt %, or 50-65 wt %, or 55-65 wt %, or 40-60 wt %, or 45-60 wt %, or 50-60 wt %, or 55-60 wt %.

The liquid acoustic adhesive compositions of the disclosure desirably use water as the solvent. In various embodiments, water is the only solvent. In some embodiments a small proportion of volatile organic liquid (i.e., boiling point less than 200° C.) is present, but it is desirably no more than 5 wt % of the overall liquid acoustic adhesive composition, e.g., no more than 2 wt %, or no more than 1 wt %, or no more than 0.5 wt %.

In some embodiments, the liquid acoustic adhesive composition has a basic pH. For example, the liquid acoustic adhesive composition has a pH in the range of 7-12, or 7-11.5, or 7-11, or 7-10.5, or 7-10, 8-12, or 8-11.5, or 8-11, or 8-10.5, or 8-10, or 8.5-12, or 8.5-11.5, or 8.5-11, or 8.5-10.5, or 8.5-10, or 9-12, or 9-11.5, or 9-11, or 9-10.5, or 9-10. In some embodiments, the one or more components suitable to provide a continuous phase of the viscoelastic material further comprises a basic pH modifier. For example, in various embodiments, the basic pH modifier is selected from sodium bicarbonate, potassium bicarbonate, or calcium carbonate. Providing a liquid acoustic adhesive composition with a basic pH can be especially desirable when an associative thickener is used as a rheology modifier.

In some embodiments of the present disclosure as described herein, the liquid acoustic adhesive formulation has a viscosity of greater than 10 Pa-s over a shear rate of 0.1-100 s$^{-1}$. For example, in some embodiments, the liquid acoustic adhesive formulation has a viscosity in the range of 10-10,000 Pa-s over a shear rate of 0.1-100 s$^{-1}$.

The liquid formulations described herein are particularly useful in sound-damping building boards. For example, in some embodiments, the liquid formulation may be disposed onto a top surface of a first plaster layer, and a second plaster layer may be disposed onto the liquid formulation such that the liquid formulation is disposed between the top surface of the first plaster layer and the bottom surface of the second plaster layer. To set the liquid formulation within the sound-damping building board, in some embodiments, the board is exposed to a setting temperature for a setting time. In some embodiments, the setting temperature is in the range of 20-35° C. In some embodiments, the setting time is in the range of 3-10 days (e.g., in the range of 5-10 days, or 7-10 days). In some embodiments as described herein, during the setting process, a weight is applied to the sound-damping building board.

Another aspect of the present disclosure provides a sound-dampening building board comprising a first plaster layer having a top surface and a bottom surface; a second plaster layer board having a top surface and a bottom surface; and the set acoustic adhesive composition as described herein disposed between the top surface of the first plaster layer and the bottom surface of the second plaster layer. Such an embodiment is shown in FIG. 1, which illustrates a plaster layer board (100) including a first plaster layer (102) having a top surface (122) and a bottom surface (112); a second plaster layer (104) having a top surface (124) and a bottom surface (114); and the set acoustic adhesive composition (101) as described herein disposed between the top surface (122) of the first plaster layer (102) and the bottom surface (114) of the second plaster layer (104).

As the person of ordinary skill in the art will appreciate, the plaster layers can be formed of a variety of materials. Gypsum is a typical material for plaster layers in building boards, but other materials can be used. For example, various plaster materials including stucco, lime, and Portland cement may be used.

In various embodiments, the first plaster layer has a thickness in the range of ¼" ½". In various embodiments, the second plaster layer has a thickness in the range of ¼" ½". In some embodiments, the thickness of the first plaster layer is equal to the thickness of the second plaster layer d. In some embodiments, the thickness of the first plaster layer is not equal to the thickness of the second plaster layer.

In some embodiments, the set acoustic adhesive composition has a thickness of in the range of 100 to 500 μm. For example, in some embodiments of the disclosure a described herein, the set acoustic adhesive composition has a thickness in the range or 150 to 500 μm, or 150 to 450 μm, or 150 to 400 μm, or 150 to 350 μm, or 150 to 300 μm, or 200 to 500 μm, or 200 to 450 μm, or 200 to 400 μm, or 200 to 350 μm, or 200 to 300 μm.

In some embodiments, the sound-dampening building board has a thickness in the range of ⅜" to 1".

Moreover, each plaster layer can comprise one or more liners disposed at the top surface and/or the bottom surface, e.g., made of paper, fiberglass, or plastic. The liners can in some embodiments be present only on the outer surfaces of the building board (i.e., at the bottom surface of the first plaster layer and at the top surface of the second plaster layer). But in some embodiments, one or more liners can be present inside the building board, i.e., at the top surface of the first plaster layer and/or the bottom surface of the second plaster layer).

Figure 2:
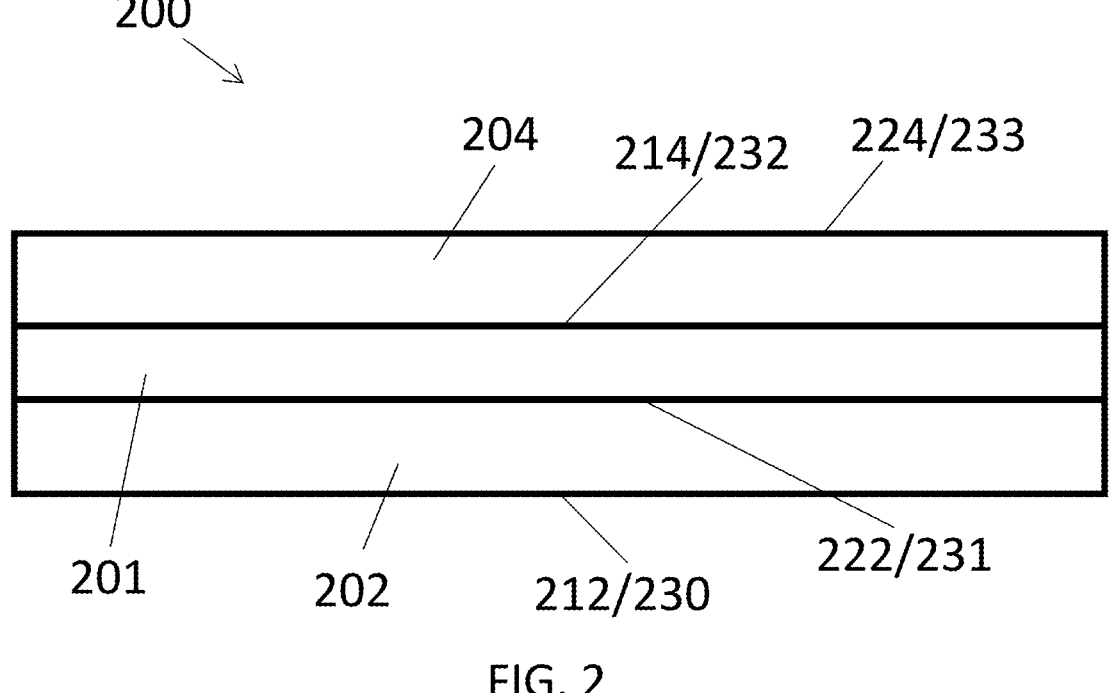
FIG. 2 is an illustration of a sound-dampening building board as described herein.

Such an embodiment is shown in FIG. 2, which illustrates a sound-dampening building board (200) including a first plaster layer (202) having a top surface (222) and a bottom surface (212); a second plaster layer (204) having a top surface (224) and a bottom surface (214); and the set acoustic adhesive composition (201) as described herein disposed between the top surface (222) of the first plaster layer (202) and the bottom surface (214) of the second plaster layer (204). Here, the first plaster layer 202 includes a liner (230) disposed at the bottom surface (212) of the first plaster layer (202) and a liner (231) disposed at the top surface (222) of the first plaster layer (202) and a liner (232) disposed at the bottom surface (214) of the second plaster layer (204) and a liner (233) disposed at the top surface (224) of the second plaster layer (204).

The sound dampening building boards of the present disclosure reduce acoustic noise. As would be understood by the person of ordinary skill in the art, mechanical impedance testing may be used to calculate acoustic performance indicators, such as the sound transmission loss (STL) curve and the loss factor. To perform the mechanical impedance testing, gypsum sample boards are cut into beams of approximate size 300 mm×22 mm. The beam size is measured precisely with a caliber and weighed. A screw button is glued with superglue in the center of one of the paper face of the beam. After the glue is cured, the sample is ready for testing. The mechanical impedance device is composed of a vertical shaker that can vibrate at different frequencies. The sample beam was screwed on top of the shaker. While the shaker screens a wide range of frequencies, sensors record the force and velocity of the beam so that the mechanical impedance of the beam can be plotted as a function of time. The composite loss factor and the STL curve of the sample could be calculated from this curve, the board dimensions, and weight. Such measurements are consistent with ASTM E756-05. For example, in some embodiments, the sound dampening building board has a loss factor of at least 10% at a frequency in the range of 175-225 Hz. In some embodiments, the sound dampening building board has a loss factor in the range of 10-18% at a frequency in the range of 175-225 Hz. For example, in some embodiments, the sound dampening building board has a loss factor of at least 12% at a frequency in the range of 800-1000 Hz. In some embodiments, the sound dampening building board has a loss factor in the range of 12-20% at a frequency in the range of 800-1000 Hz. For example, in some embodiments, the sound dampening building board has a loss factor of at least 16% at a frequency in the range of 2000-2500 Hz. In some embodiments, the sound dampening building board has a loss factor in the range of 16-24% at a frequency in the range of 2000-2400 Hz. In some embodiments, the sound dampening building board has a loss factor of at least 12% at a frequency in the range of 800-1000 Hz, and has a loss factor of at least 16% at a frequency in the range of 2000-2500 Hz. In some embodiments, the sound dampening building board has a loss factor in the range of 10-18% at a frequency in the range of 175-225 Hz, a loss factor in the range of 12-20% at a frequency in the range of 800-1000 Hz, and a loss factor in the range of 16-24% at a frequency in the range of 2000-2400 Hz.

Another aspect of the present disclosure provides a method for making the sound dampening building board as described herein. The method includes providing a first plaster layer having a top surface and a bottom surface and a second plaster layer having a top surface and a bottom surface; disposing the liquid acoustic adhesive formulation as described herein between the top surface of the first plaster layer and the bottom surface of the second plaster layer; and allowing the liquid acoustic adhesive formulation to set to provide the set acoustic adhesive composition. Disposing the liquid acoustic adhesive composition may be accomplished by any means as known in the art.

The liquid acoustic adhesive formulation can be allowed to set in a number of ways. For example, a heating step can be performed for a time and at a temperature sufficient to provide a set acoustic adhesive composition as described herein. For example, in various embodiments, the heating occurs at a temperature in the range of 50-350° C., or 50-325° C., or 50-300° C. In various embodiments, the curing occurs at a temperature in the range of 100-350° C., or 100-325° C., or 100-300° C., or 150-350° C., or 150-325° C., or 150-300° C., or 200-350° C., or 200-325° C., or 200-300° C. In some embodiments, the heating occurs for a time in the range of 30 minutes to 3 hours (e.g., 1-3 hours, or 2-3 hours).

EXAMPLES

The Examples that follow are illustrative of specific embodiments of the compositions, products, methods of the disclosure, and various uses thereof. They are set forth for explanatory purposes only, and are not to be taken as limiting the scope of the disclosure.

Example 1. Evaluation of Continuous Phase of Viscoelastic Material

A variety of waterborne latex materials were evaluated for their acoustic rheology properties. No additional material was added to the latex. To provide test samples, each material was spread on a sheet of PET film at a thickness of approximately 2 mm and allowed to dry for 24 hours at ambient conditions. The samples were then placed in a convection oven at 70° C. for 12-18 hours to accelerate aging.

Figure 3A:
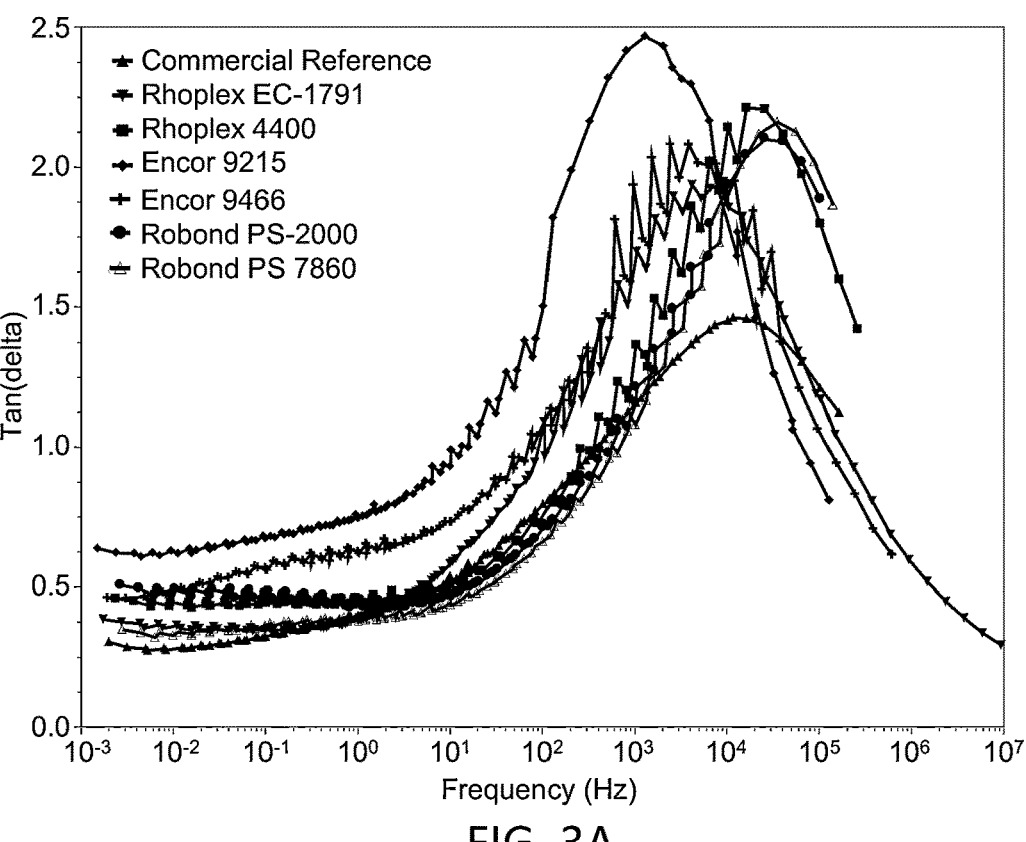
FIG. 3A is a graph of the Tan δ versus frequency (Hz) of a variety of viscoelastic materials as described herein.
Figure 3B:
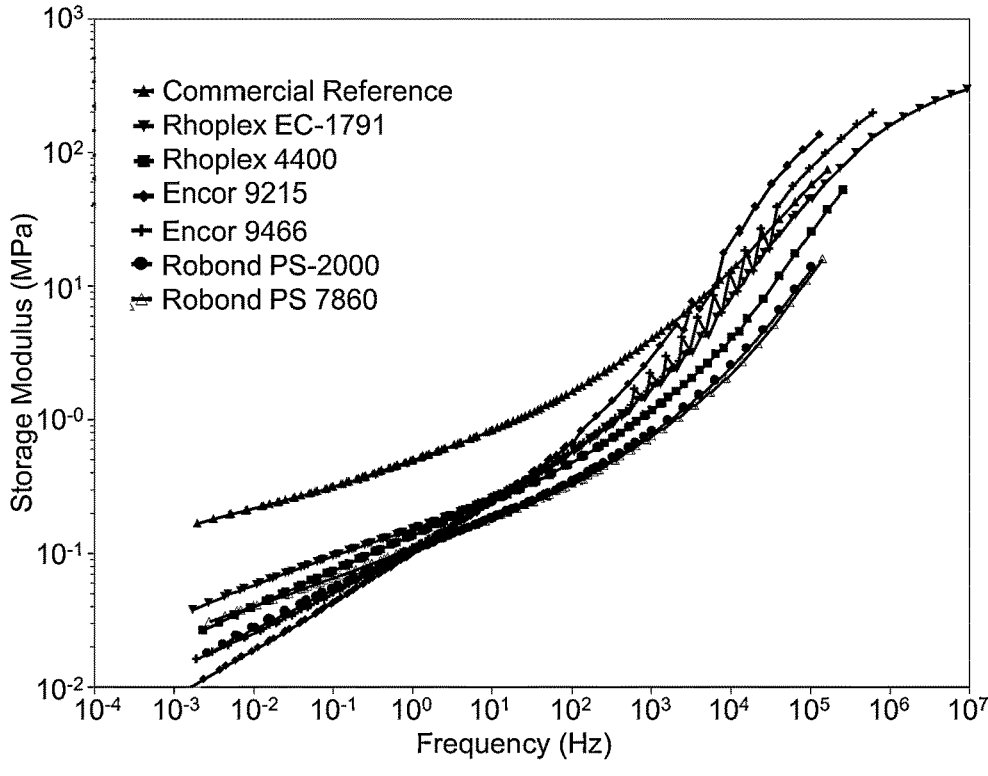
FIG. 3B is a graph of the storage modulus (G') versus frequency (Hz) of a variety of viscoelastic materials as described herein.

To evaluate the sound-dampening properties of the dried sample, the mechanical responses of the polymer samples were measured in a parallel plate rheometer using an 8 mm parallel plate geometry with a Discovery Series Hybrid Rheometer (DHR) from TA Instruments. Frequency sweeps, from 0.1 to 100 rad/s were performed at 10° C. increments from 40° C. to −30° C. the frequency sweeps obtained at each temperature were then shifted using the Williams-Landel-Ferry (WLF) model to obtain a master curve showing G', G", and the Tan δ over a broad range of frequencies using the time-temperature superposition principle. The resulting Tan δ and storage modulus (G') of the late samples tested are shown in FIGS. 3A and 3B, respectively. Table 1 reports the Tan δ height and Tan δ location for each latex samples tested.

TABLE 1

| Latex | Supplier | Tan δ Height | Tan δ Location (kHz) |
|---|---|---|---|
| Commercial Reference | Saint-Gobain | 1.46 | 11.8 |
| Rhoplex EC-1791 | Dow | 1.95 | 9.4 |
| Rhoplex 440 | Dow | 2.21 | 16.4 |
| Encor 9215 | Arkema | 2.41 | 1.8 |
| Encor 9466 | Arkema | 2.03 | 4.4 |
| Robond PS-2000 | Dow | 2.10 | 26.3 |
| Robond PS-7860 | Dow | 1.74 | 13.8 |

While the Tan δ peak location is in the desired range and the Tan δ peak height is of the desired value, the storage modulus values of these latexes are not stiff enough to provide the desired storage modulus to the overall material.

Example 2. Evaluation of Particulate Polymer-Filled Continuous Phase

To increase the overall stiffness of the composition, a particulate polymer filler was added to the Rhoplex EC-1791 latex tested in Example 1. Rhoplex EC-1791 was chosen as it is cost-effective and has a starting pH of approximately 9, which can be beneficial when using associative thickeners. A styrene/butadiene particulate polymer (LIGOS A3411, $d_{50}$~157 nm) was used as the polymer filler because it is one of the cheapest, non-polar, commercially available polymer dispersions. Additionally, to some formulations, a rosin ester tackifier (Dermulsene RE1513 from DRT) was added to adjust the location of the Tan δ.

Figure 4A:
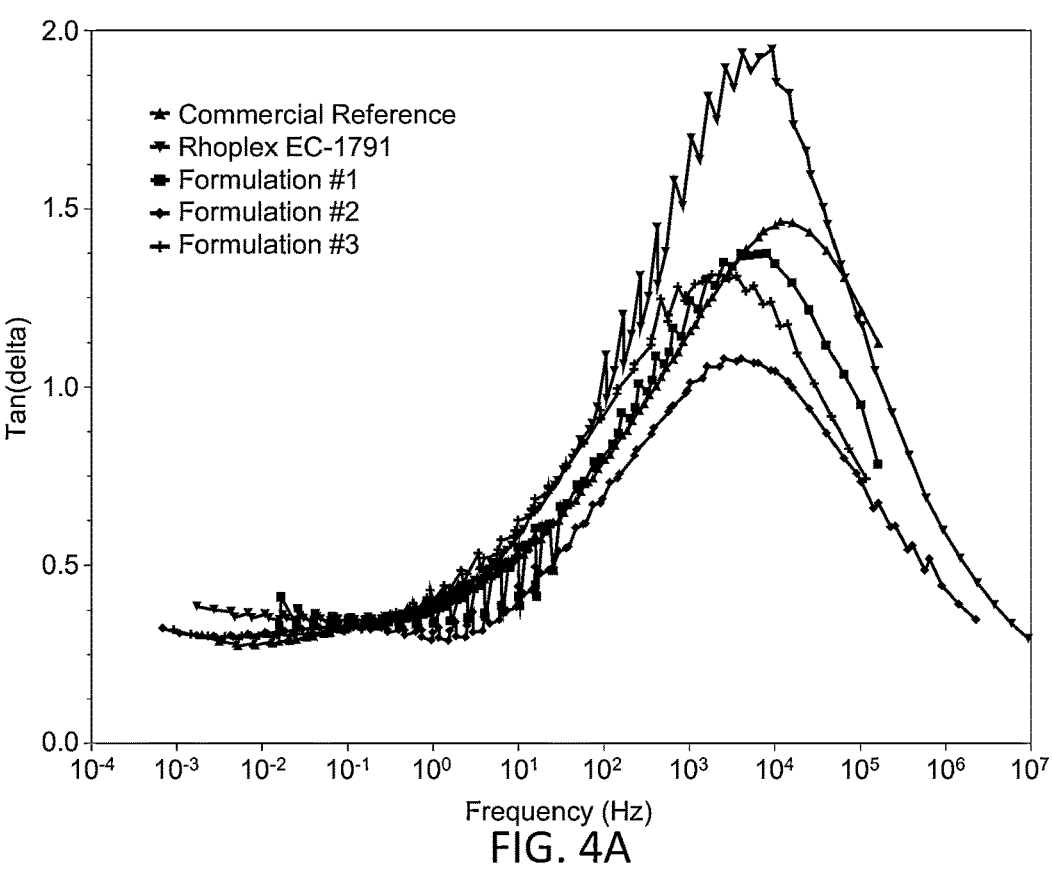
FIG. 4A is a graph of the Tan δ versus frequency (Hz) of a variety of set acoustic adhesive compositions as described herein.
Figure 4B:
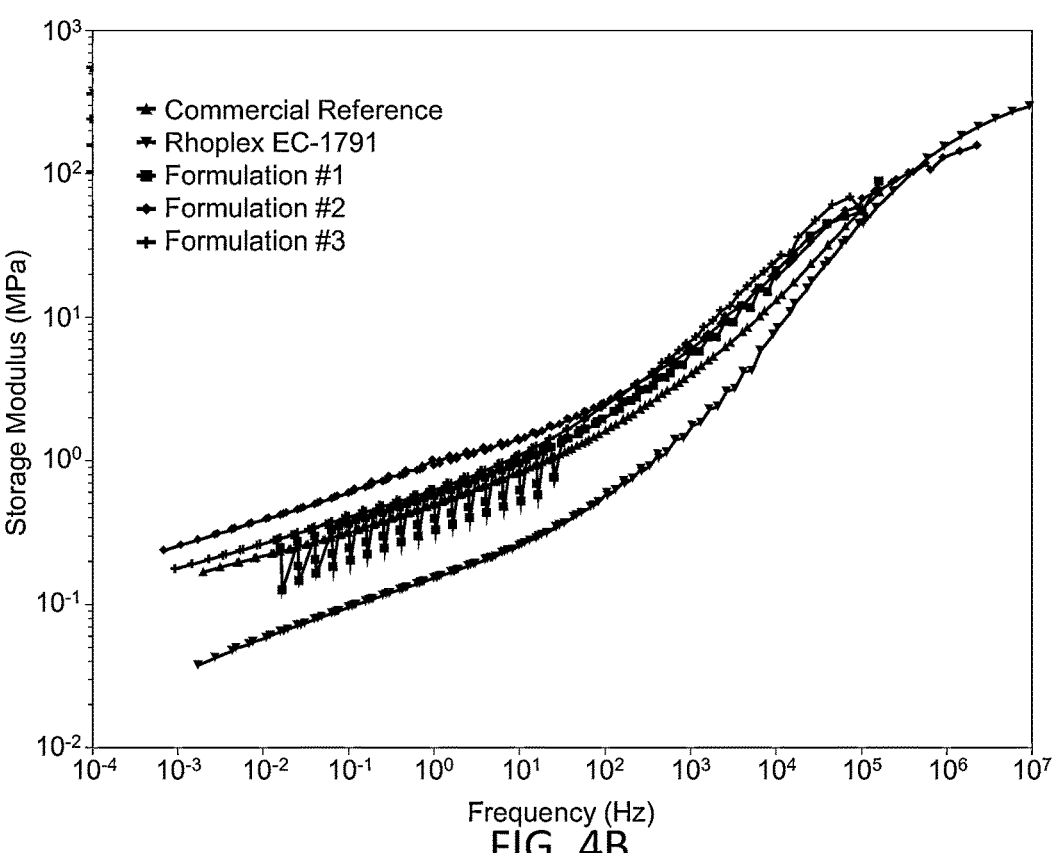
FIG. 4B is a graph of the storage modulus (G') versus frequency (Hz) of set acoustic adhesive compositions as described herein.

To make the formulations, the latex was added to a container and placed underneath an overhead stirrer equipped with a blade (paddle, cowls, or pitch) with an RPM of approximately 300. Then, the reminder of the formulation was added one at a time while maintaining a vortex (RPM of approximately 600-1200). Once all the ingredients were added to the formulation, it was allowed to stir for 30 minutes. Samples of each formulation were then dried on PET films and tested for their damping properties, as described in Example 1. The resulting Tan δ and storage modulus (G') are shown in FIGS. 4A and 4B, respectively. Table 2 reports the formulations (in parts per hundred rubber (PHR) on a dry solids basis) and the Tan δ height and Tan δ location for each formulation tested, and compares them to Commercial Reference and the Rhoplex EC-1791 latex.

TABLE 2

| Formulation | Rhoplex EC-1791 (PHR) | Poly-styrene (PHR) | Dermulsene RE1513 (PHR) | Tan δ Height | Tan δ Location (kHz) |
|---|---|---|---|---|---|
| Commercial Reference | — | — | — | 1.46 | 11.8 |
| Rhoplex EC-1791 | 100 | 0 | 0 | 1.95 | 9.42 |
| 1 | 100 | 20 | 0 | 1.36 | 5.47 |
| 2 | 100 | 25 | 10 | 1.08 | 2.58 |
| 3 | 100 | 20 | 12 | 1.31 | 2.28 |

Without intending to be bound by theory, the present inventors surmise that the tackifier breaks up polymer chain entanglements to increase chain mobility at low frequency. At high frequency, the rigid structure of the tackifier increases the modulus, therefore shifting peak position and slightly increasing the peak height. The initial loading of 25 parts polystyrene to 10 parts of tackifier in formulation 2 resulted in a dampened Tan δ peak height and a stiff storage modulus compared to Commercial Reference. Therefore, the loading of the polystyrene was reduced and the tackifier loading was increased (formulation 3).

Figure 5:
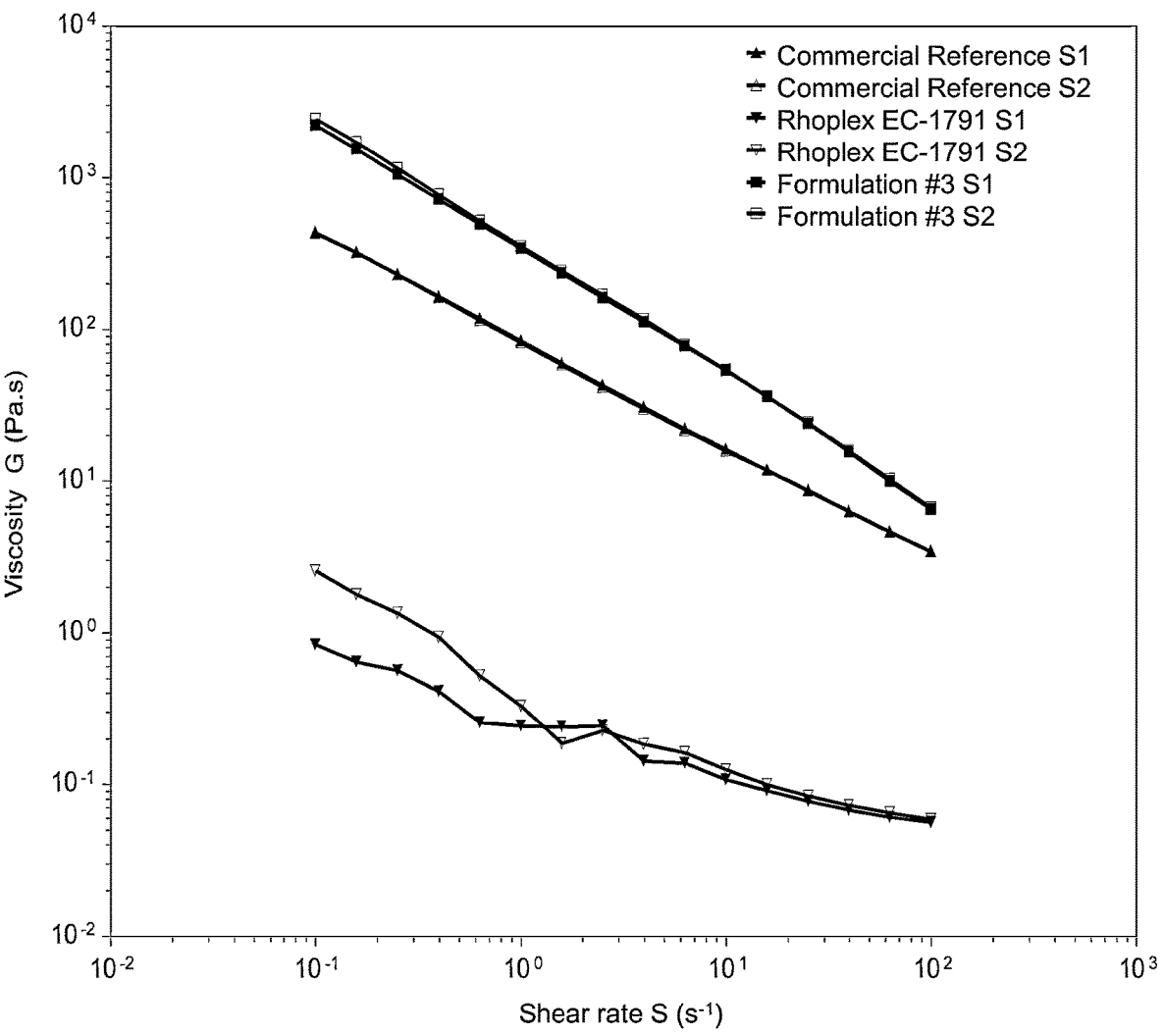
FIG. 5 is a graph of the viscosity versus shear rate of a liquid acoustic adhesive formulation as described herein.

The viscosity of the wet formulations (as mixed) listed in Table 2 were also tested using a DHR rheometer with 25 mm parallel plates with a 1 mm gap. Sheer sweeps were performed from 100 to 0.1 s⁻¹. However, the viscosity of the formulation 3 needed to be adjusted to be useful in a plaster board. In order to increase the viscosity, a hydrophobically modified, alkaline soluble emulsion (HASE) thickener (Acrysol TT-615) was added to formulation 3. The pH of the mixture was measured to be approximately 9, which is within the range required to add the associative thickener. If the pH of the mixture is not basic, then sodium carbonate (or bicarbonate) can be added to increase the pH. 1 part solids of Acrysol TT-615, from Dow, was added to the polymer mixture at a rate of ~4 drops per minute while mixing at 1000 rpm with a Heidolph overhead mixer equipped with a 1.5" Cowles blade. If added to the polymer mixture too quickly, the Acrysol can form spherical aggregates. These aggregates could be broken apart by increasing the mixing speed and letting it mix for up to 30 minutes. The resulting increase in the viscosity profile is shown in FIG. 5.

Example 3. Evaluation of Additional Particulate Polymer Filled Formulations

Figure 6A:
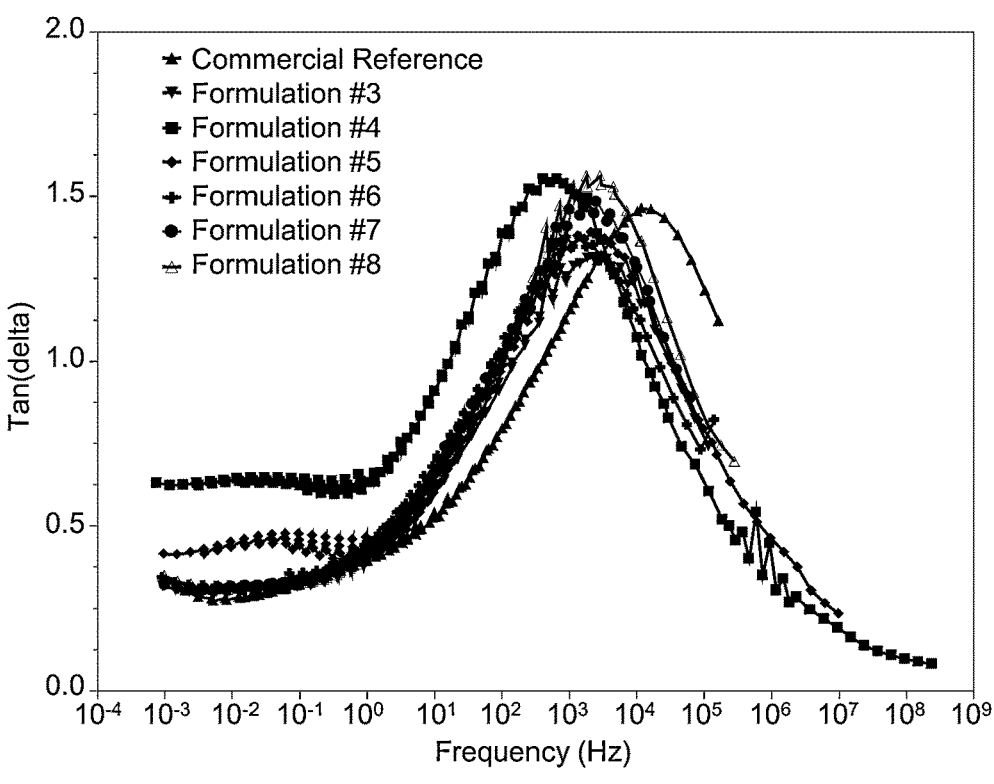
FIG. 6A is a graph of the Tan δ versus frequency (Hz) of a variety of set acoustic adhesive compositions as described herein.
Figure 6B:
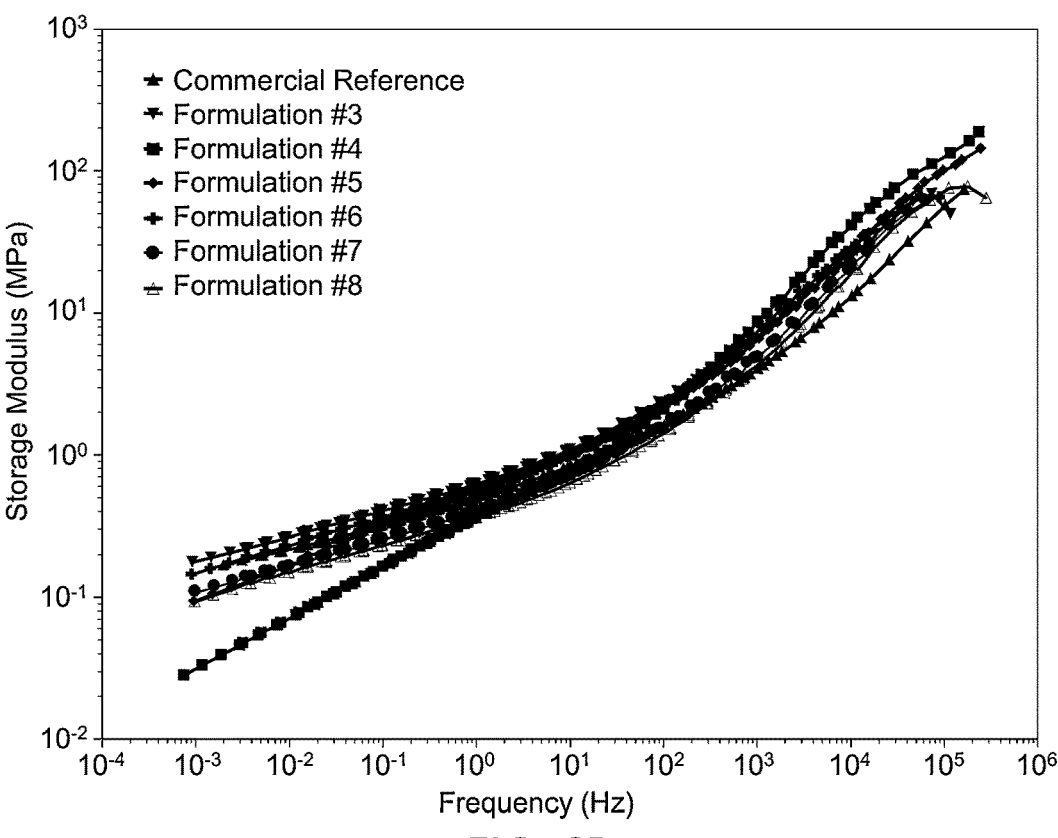
FIG. 6B is a graph of the storage modulus (G') versus frequency (Hz) of set acoustic adhesive compositions as described herein.
Figure 6C:
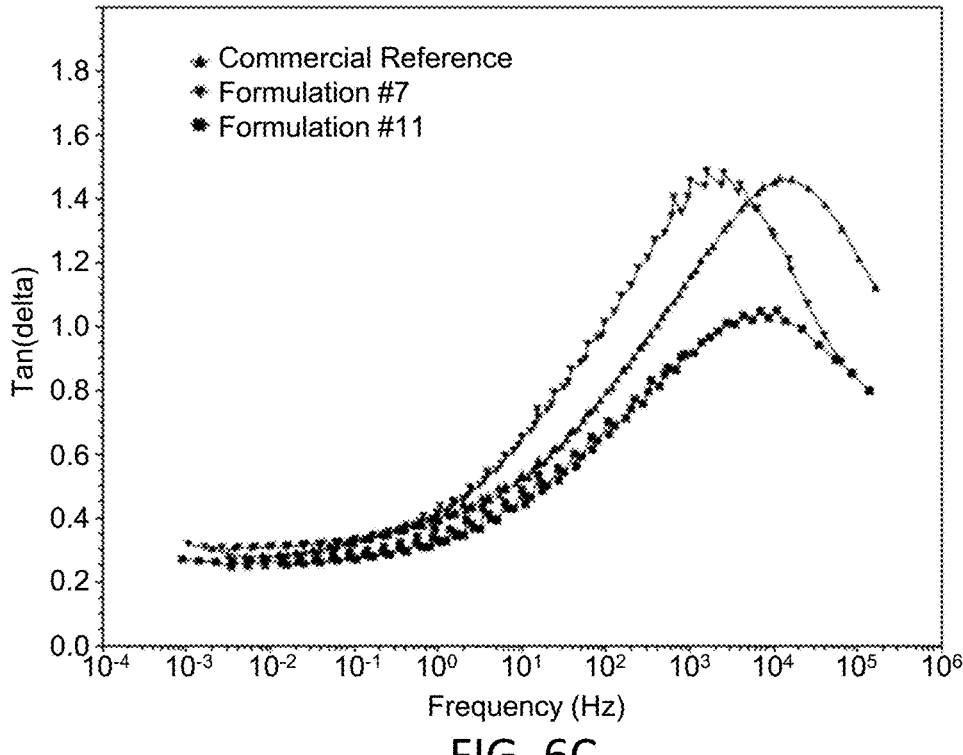
FIG. 6C is a graph of the Tan δ versus frequency (Hz) of a variety of set acoustic adhesive compositions as described herein.
Figure 7A:
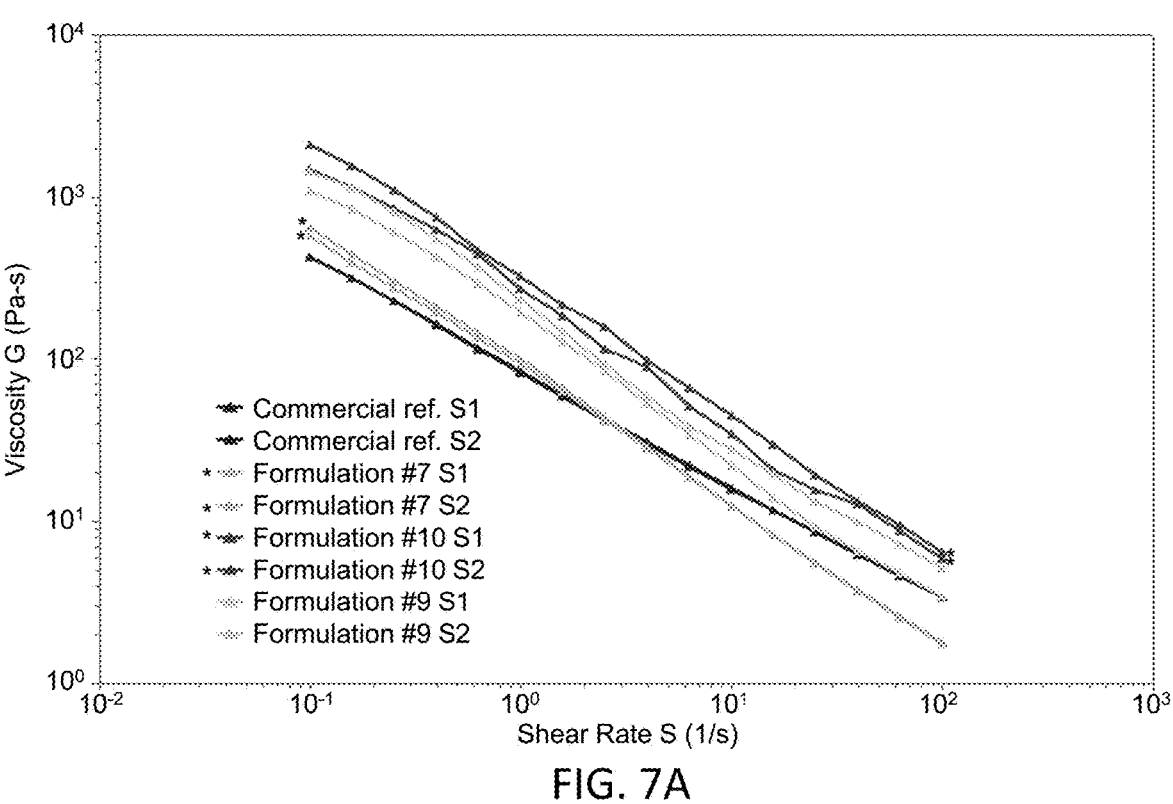
FIG. 7A is a graph of the viscosity versus shear rate of a liquid acoustic adhesive formulation as described herein.
Figure 7B:
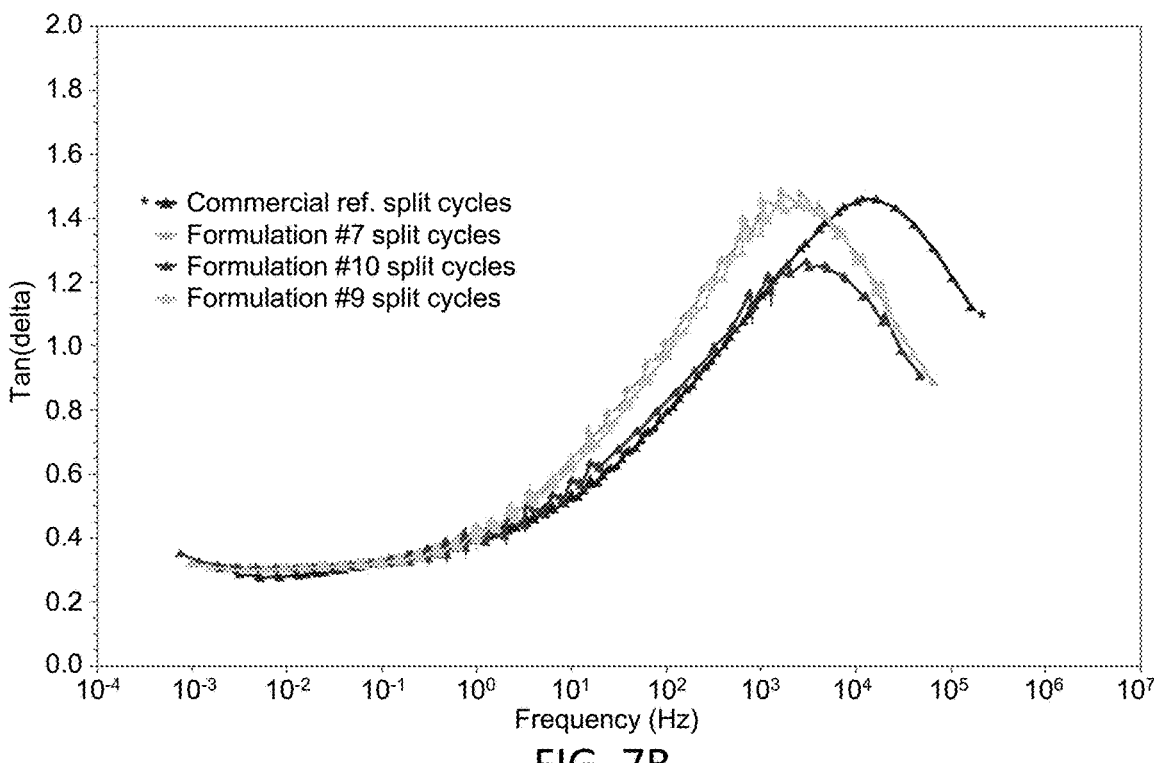
FIG. 7B is a graph of the Tan δ versus frequency (Hz) of a variety of set acoustic adhesive compositions as described herein.
Figure 7C:
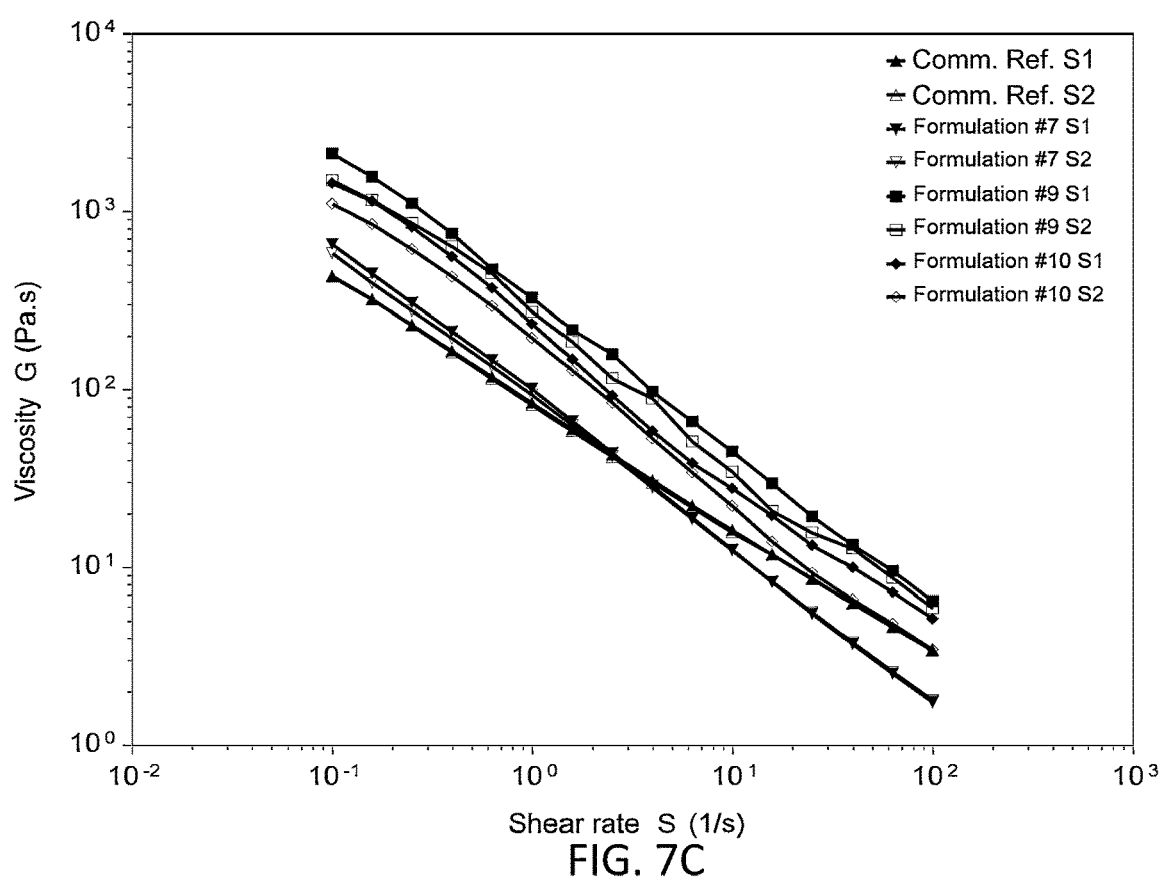
FIG. 7C is a graph of the storage modulus (G') versus frequency (Hz) of set acoustic adhesive compositions as described herein.
Figure 7D:
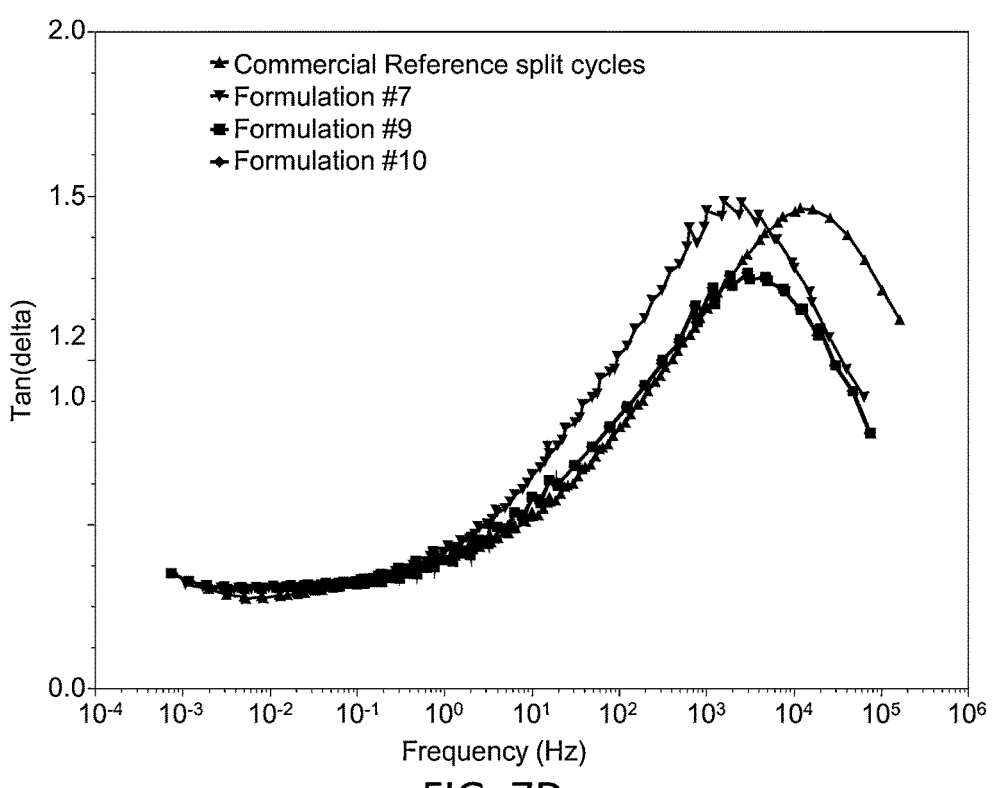
FIG. 7D is a graph of the loss modulus (G") versus frequency (Hz) of set acoustic adhesive compositions as described herein.

Latexes, tackifiers, and other polymer fillers, such as polymethylmethacrylate (PMMA) were also evaluated. The dried samples of the formulations were made and the damping properties were evaluated as described in Example 1. Table 3 reports the formulations (in parts per hundred rubber (PHR)) and Table 4 reports the Tan δ height and Tan δ location for each formulation tested, and compares them to Commercial Reference and formulation 3. The resulting Tan δ and storage modulus (G') are shown in FIGS. 6A, 6B, and 6C, respectively.

lation 7 (described in Table 3) at both 15% (formulation 9) and 20% (formulation 10) solids. The speed of mixing the clay and cellulosic mixture and the formulation 7 was increased to 1200 RPM.

Dried samples of the formulations were made and the damping properties were evaluated as described in Example 1. FIGS. 7A, 7B, 7C, and 7D report the viscosity of these wet formulations, the Tan δ of the dried samples, the storage modulus of the dried samples, and the loss modulus of the dried samples, respectively. Table 5 reports the Tan δ height and Tan δ location for each formulation tested with the mineral addition and compares them to Commercial Reference and formulation 7.

TABLE 3

| Formulation | Latex | Latex (PHR) | Polymer Filler | Polymer Filler (PHR) | Tackifier | Tackifier (PHR) |
|---|---|---|---|---|---|---|
| 4 | Encor 9215 | 100 | LIGOS A3411 | 20 | Dermulsene RE 1513 | 12 |
| 5 | Encor 9466 | 100 | LIGOS A3411 | 20 | Dermulsene RE 1513 | 12 |
| 6 | Rhoplex EC-1791 | 100 | LIGOS A3411 | 20 | Tacolyn 3100 | 12 |
| 7 | Rhoplex EC-1791 | 100 | LIGOS A3411 | 20 | Tacolyn 1070 | 12 |
| 8 | Rhoplex EC-1791 | 100 | Rhoplex GL-720 Polymethylmethacrylate | 20 | Dermulsene RE 1513 | 12 |
| 11 | Rhoplex EC-1791 | 100 | Olin Epoxy Dispersion | 20 | Tacolyn 1070 | 12 |

TABLE 4

| Formulation | Tan δ Height | Tan δ Location (kHz) |
|---|---|---|
| Commercial Reference | 1.46 | 11.8 |
| 3 | 1.31 | 2.28 |
| 4 | 1.55 | 0.41 |
| 5 | 1.39 | 2.11 |
| 6 | 1.38 | 0.89 |
| 7 | 1.48 | 1.64 |
| 8 | 1.56 | 1.80 |
| 11 | 1.05 | 11.02 |

TABLE 5

| Formulation | Tan δ height | Tan δ location (kHz) |
|---|---|---|
| Weber | 1.46 | 11.84 |
| 7 | 1.48 | 1.64 |
| 9, no acrysol, 15% clay:mhec | 1.46 | 1.60 |
| 10, no acrysol, 20% clay:mhec | 1.26 | 3.02 |

The viscosity of formulations 9 and 10, with 15% and 20% mineral filler, respectively, are slightly higher than both Weber and the original 7 formulation. One possible issue with mineral addition is settling in the final product. This is an advantage that the polymer filled formulation has over the mineral formulation.

The modified 3 formulation using PMMA (i.e., formulation 8) resulted in acceptable criteria. This demonstrates the flexibility of the formulation structure and ability to use a variety of high $T_g$ polymers.

Example 4. Evaluation of Addition of Mineral Filler to Particulate Polymer Filled Formulations To further evaluate the polymer filled formulation, an additional mineral filler was added and the results formulation was evaluated for its damping properties. The addition of mineral to the formulation is preferred for two reasons; to increase the rheology of the formulation without adding the HASE modifier and to reduce the cost of the final product.

A combination of clay and a methyl hydroxyethyl cellulosic thickener were chosen as a mineral filler as it delivered the required rheology. Specifically, Burgess #40 clay and Walocel MW40000PFV cellulosic thickener were mixed together in a ratio of 95% clay to 5% Walocel MW40000PFV. To mix the clay and cellulosic thickener, the two components were placed in a FlackTek speed mixer for 2 minutes at 2000 RPM to ensure sufficient incorporation. The clay and cellulosic mixture were then added to formu-

Example 5. Mechanical Testing

The formulations 2 and 7, as discussed above, were tested for their mechanical properties. Specifically, the tests performed were a mechanical impedance measurement test (MIM), differential mechanical analysis (DMA), and a Z-pull test, as described in more detail below.

Mechanical Impedance Measurement (MIM)

The MIM test is used to collect information about the sound transmission loss (STL) curve of a product including the acoustic adhesive formulation applied to two blank pieces of gypsum and measures the mechanical impedance of such a product over a wide range of frequencies. From this measurement, acoustic performance indicators can be calculated, such as the sound transmission loss curve and the loss factor. The MIM test was used to validate the acoustic properties of formulation 2 by comparison to a computer simulation. Gypsum sample boards were cut into beams of approximate size 300 mm×22 mm. The beam size was measured precisely with a caliber and weighted. A screw button was glued with superglue in the center of one of the paper face of the beam. After the glue is cured, the sample was ready for testing.

The MIM device was composed of a vertical shaker that can vibrate at different frequencies. The sample beam was screwed on top of the shaker. While the shaker screens a wide range of frequencies, sensors record the force and velocity of the beam so that the mechanical impedance of the beam can be plotted as a function of time. The composite loss factor and the STL curve of the sample are then calculated from this curve and the board dimensions and weight.

Figure 8:
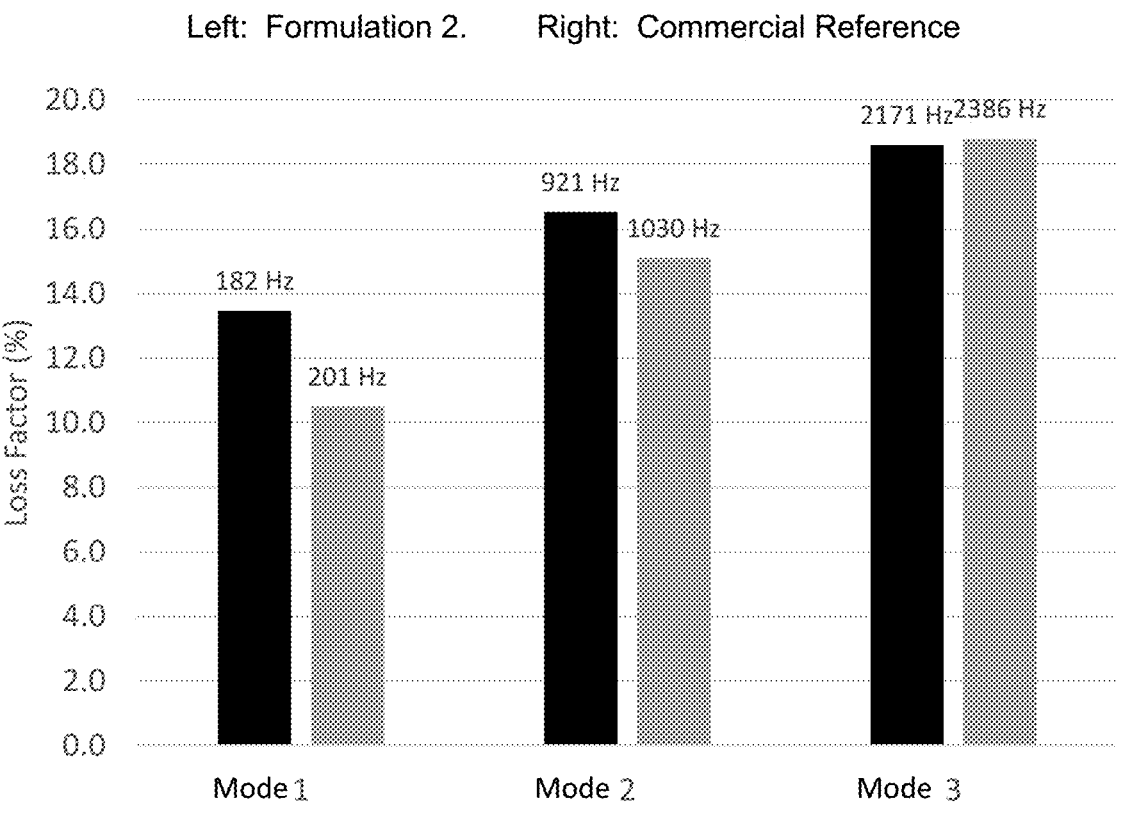
FIG. 8 is a chart of the mechanical impedance measurement of the acoustic adhesive composition as described herein.

The MIM testing results for formulation 2 are shown in FIG. 8 and are compared to Commercial Reference. The loss factor of formulation 2 is comparable to Commercial Reference for each frequency mode tested and meets the desired acoustic criteria.

Differential Mechanical Analysis

The "score & snap" test of the inline laminate is an important experimental screening method to determine crack path in the end use product. The crack path of the sandwiched board is strongly dependent on the acoustic glue storage modulus (E'). However, the quality of the "score & snap" test is subjective as the results are dependent on human observation. A qualitative method to measure the storage modulus (E') of viscoelastic glues was developed. The storage modulus for a given thickness of material is measured using Differential Mechanical Analysis (DMA).

For the differential mechanical analysis, RSA G2 by TA Instruments was used to measure the tensile storage modulus of potential materials. A rectangular fixture was used to apply a sinusoidal tensile deformation of given frequency and amplitude to a rectangular piece of material. The initial gauge length was fixed at 15 mm and width at 5.6 mm, while thickness depended on the material and was measured before each measurement with a caliber. The test was conducted at room temperature. First, a strain sweep was performed at rad/s from 0.01% to 5%. Then a frequency sweep was programmed at 0.3% maximum strain, from 5 to 600 rad/s. Each material was run in 3 duplicates. To measure the modulus of formulation, a layer of liquid formulation was left to cure at 70° C. on a PTFE release liner. After 24 hours curing, one can peel a free-standing formulation film that is suitable for DMA.

Figure 9A:
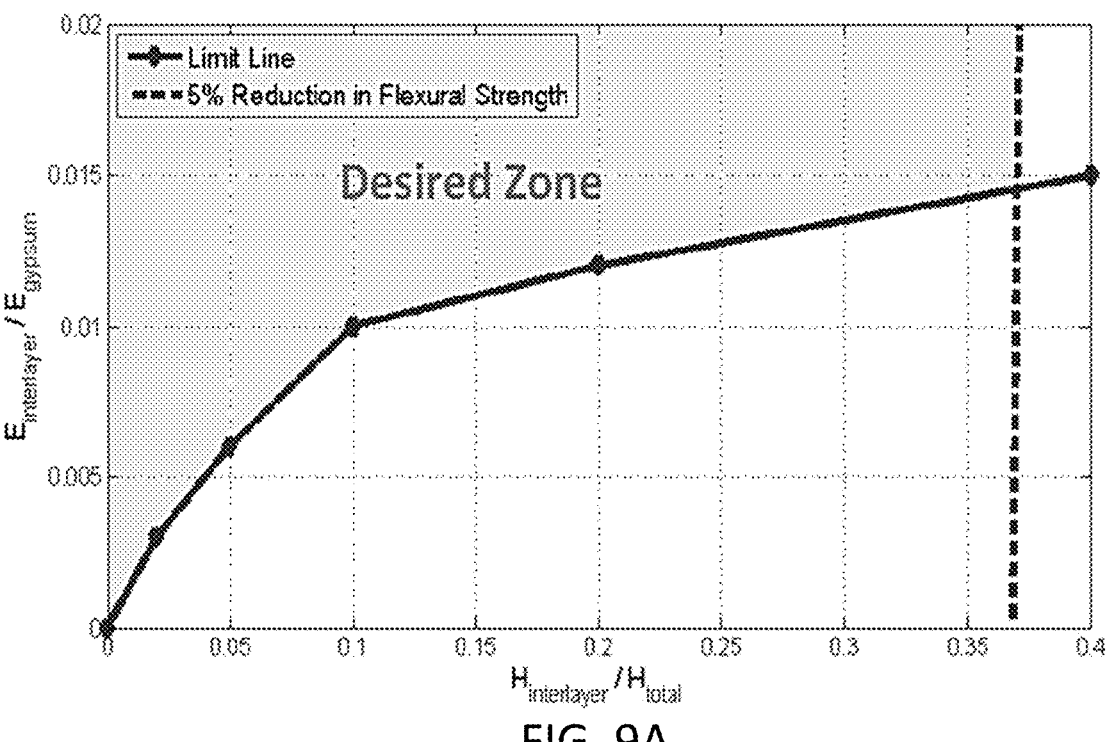
FIG. 9A is a graph of a simulation curve of the storage modulus of viscoelastic materials.
Figure 9B:
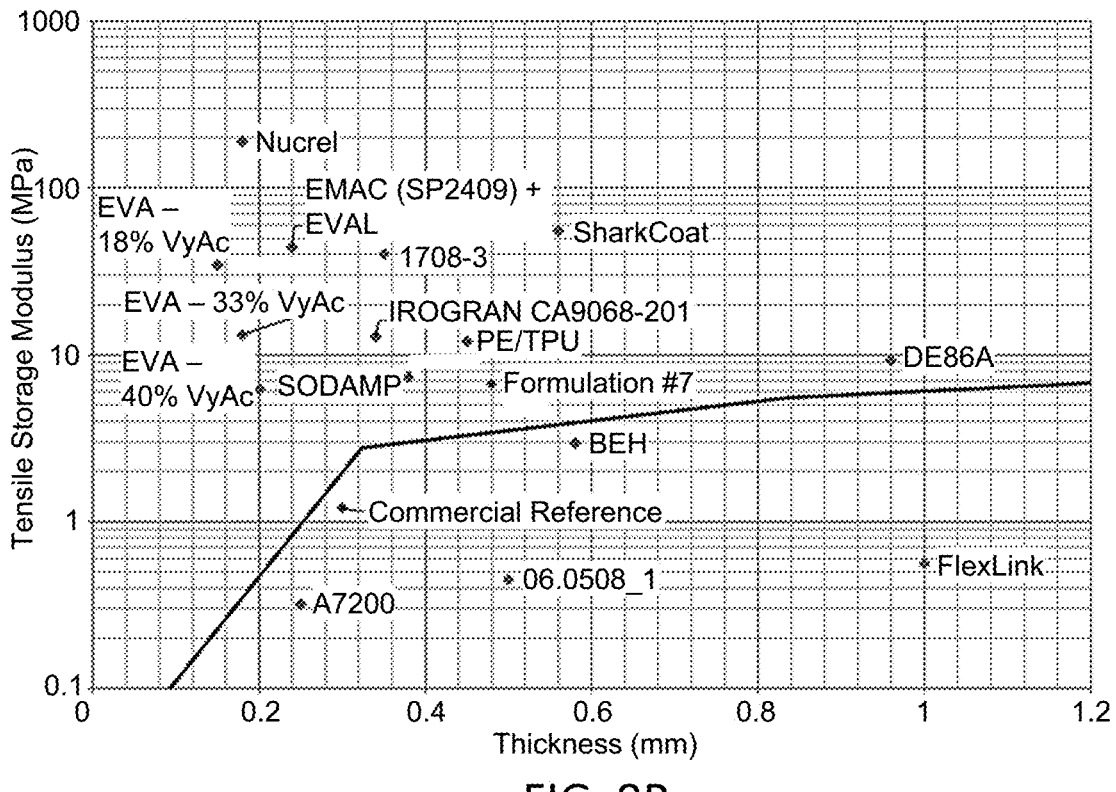
FIG. 9B is a graph of simulation curve of the storage modulus of viscoelastic materials and set acoustic adhesive compositions as described herein.

Results for a variety of viscoelastic glues tested were used to construct a simulation curve that is dependent on the measured storage modulus at a defined thickness. FIG. 9A depicts this simulation curve. The results of the elastic modulus measured using the DMA for Commercial Reference and formulation 7 are plotted on the simulation curve in FIG. 9B. The storage modulus for formulation 7 is located in the "desired zone" above the simulation limit line indicating that the developed formulation is likely to give a desirable, straight path crack propagation in "score & snap testing".

Z-Pull Testing

Z-pull testing is used to test the adhesion properties of the formulations as described herein when used in a sandwiched board. This method has been used to evaluate the adhesion strength of formulations 2 and 7. A 2"×2" square piece of board was cut with a tile saw. Two plywood boards were then epoxy glued on each face of the square's paper side. An Instron was used to separate the two gypsum layers and monitor the associated force with pulling speed at 2 mm/s and the load cell at 1000 N. The test would stop after rupture of the board or the paper. The peak load at failure (N) and the type of failure were recorded.

Figure 10:
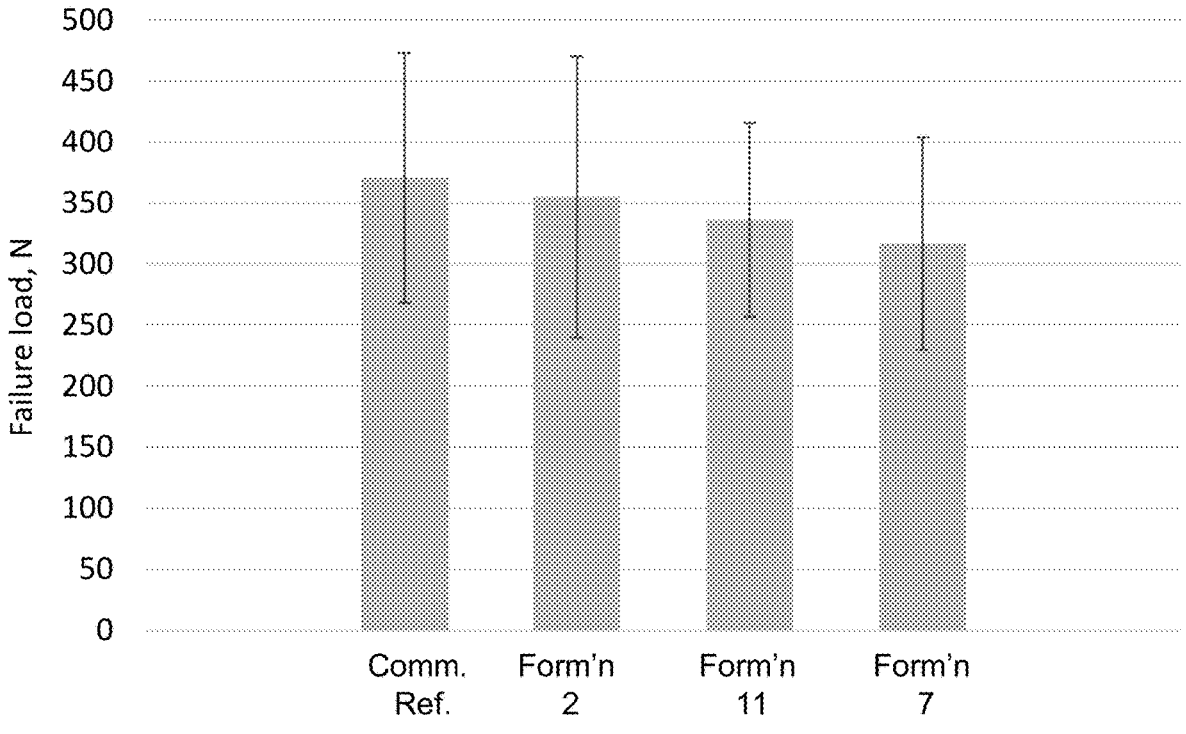
FIG. 10 is a graph of the Z-pull test results of set acoustic adhesive compositions as described herein.

In addition to testing formulation 2 and 7 for adhesion, formulation 11 was also tested. Formulation 11 is based on formulation 2, but does not have a tackifier. The results of the adhesion (Z-Pull) testing are shown in FIG. 10. All versions of the adhesive formulation pass the Z-Pull desired criteria, indicating that the formulations with and without a tackifier have a comparable adhesion to Commercial Reference.

Various aspects and embodiments of the disclosure are provided by the following enumerated embodiments, which can be combined in any number and in any combination not technically or logically inconsistent.

Embodiment 1. A set acoustic adhesive composition having a storage modulus at 20° C. of at least 2.0 MPa at 20° C. over a frequency of 1-10 kHz, the set acoustic adhesive composition comprising:

a continuous phase of a viscoelastic material having a glass transition temperature ($T_g$) no greater than 0° C. present in an amount in the range of 60-95 wt % of the set acoustic adhesive composition; and dispersed in the continuous phase, a particulate polymer filler having a glass transition temperature ($T_g$) of at least 60° C. present in an amount in the range of 5-40 wt % of the set acoustic adhesive composition.

Embodiment 2. The set acoustic adhesive composition of Embodiment 1, wherein the continuous phase of the viscoelastic material has a glass transition temperature ($T_g$) no greater than −10° C. (e.g. no greater than −15° C., or no greater than −20° C.).

Embodiment 3. The set acoustic adhesive composition of Embodiment 1, wherein the continuous phase of the viscoelastic material has a glass transition temperature ($T_g$) in the range of −60 to 0° C. (e.g., e.g., in the range of −60 to −10° C., or −60 to −15° C., or −60 to −20° C., or −50 to 0° C., or −50 to 10° C., or −50 to −15° C., or −50 to −20° C., or −40 to 0° C., or −40 to −10° C., or −40 to −15° C., or −40 to −20° C.).

Embodiment 4. The set acoustic adhesive composition of any of Embodiments 1-3, wherein the continuous phase of the viscoelastic material lacks a glass transition temperature in excess of 20° C.

Embodiment 5. The set adhesive composition of any of Embodiments 1-4, wherein the particulate polymer filler has a glass transition temperature ($T_g$) of at least 70° C., e.g., at least 80° C., or at least 90° C.

Embodiment 6. The set adhesive composition of any of Embodiments 1-4, wherein the particulate polymer filler has a glass transition temperature ($T_g$) in the range of 60-175° C., e.g., 70-175° C., or 80-175° C., or 90-175° C., or 60-150° C., or 70-150° C., or 80-150° C., or 90-150° C., or 60-125° C., or 70-125° C., or 80-125° C., or 90-125° C.

Embodiment 7. The set acoustic adhesive composition of any of Embodiments 1-6, wherein the particulate polymer filler lacks a glass transition temperature ($T_g$) of less than 40° C.

Embodiment 8. The set adhesive composition of any of Embodiments 1-7, wherein the particulate polymer filler has a storage modulus at 20° C. over a frequency of 1-10 kHz of at least 50 times a storage modulus at 20° C. of the continuous phase at 20° C. over a frequency of 1-10 kHz.

Embodiment 9. A set acoustic adhesive composition having a storage modulus at 20° C. of at least 2.0 MPa at 20° C. over a frequency of 1-10 kHz, the set acoustic adhesive composition comprising:

a continuous phase of a viscoelastic material present in an amount in the range of 60-95 wt % of the set acoustic adhesive composition; and dispersed in the continuous phase, a particulate polymer filler present in an amount in the range of 5-40 wt % of the set acoustic adhesive composition, wherein the particulate polymer filler has a storage modulus at 20° C. of at least 50 times a storage modulus at 20° C. of the continuous phase at 20° C., over a frequency of 1-10 kHz (e.g., over a frequency of 1-8 kHz, or 1-6 kHz, or 1-4 kHz).

Embodiment 10. A set acoustic adhesive composition of any of Embodiments 1-9, wherein the particulate polymer filler has a storage modulus at 20° C. that is at least 100 times, e.g., at least $10^3$ times, or at least $10^4$ times a storage modulus at 20° C. over a frequency of 1-10 kHz of the continuous phase of the viscoelastic material, over a frequency of 1-10 kHz (e.g., over a frequency of 1-8 kHz, or 1-6 kHz, or 1-4 kHz).

Embodiment 11. A set acoustic adhesive composition of any of Embodiments 1-10, wherein the particulate polymer filler has a storage modulus at 20° C. over a frequency of 1-10 kHz of at least 1000 MPa, e.g., at least 1500 MPa, over a frequency of 1-10 kHz (e.g., over a frequency of 1-8 kHz, or 1-6 kHz, or 1-4 kHz).

Embodiment 12. A set acoustic adhesive composition of any of Embodiments 1-10, wherein the particulate polymer filler has a storage modulus at 20° C. over a frequency of 1-10 kHz in the range of 1000 to 5000 MPa, e.g., in the range of 1000 to 4000 MPa, or 1000 to 3000 MPa, or 1500 to 5000 MPa, or 1500 to 3000 MPa, over a frequency of 1-10 kHz (e.g., over a frequency of 1-8 kHz, or 1-6 kHz, or 1-4 kHz).

Embodiment 13. A set acoustic adhesive composition of any of Embodiments 1-12, wherein the continuous phase of the viscoelastic material has a storage modulus at 20° C. of no more than 1 MPa, e.g., no more than 0.5 MPa or no more than 0.2 MPa, over a frequency of 1-10 kHz (e.g., over a frequency of 1-8 kHz, or 1-6 kHz, or 1-4 kHz).

Embodiment 14. A set acoustic adhesive composition of any of Embodiments 1-12, wherein the continuous phase of the viscoelastic material has a storage modulus at 20° C. in the range of 0.01 to 1 MPa (e.g., in the range of 0.01 to 0.5 MPa, or 0.01 to 0.2 MPa, or 0.1 to 1 MPa, or 0.1 to 0.5 MPa, or 0.1 to 0.2 MPa), over a frequency of 1-10 kHz (e.g., over a frequency of 1-8 kHz, or 1-6 kHz, or 1-4 kHz).

Embodiment 15. The set acoustic adhesive composition of any of Embodiments 1-14 having a storage modulus at 20° C. of at least 2.5 MPa (e.g., at least 3.0 MPa, or at least 3.5 MPa, or at least 4.0 MPa) over a frequency of 1-10 kHz.

Embodiment 16. The set acoustic adhesive composition of any of Embodiments 1-14 having a storage modulus at 20° C. in the range of 2.0 MPa to 6.0 MPa (e.g., in the range of 2.5 MPa to 6.0 MPa, or 3.0 MPa to 6.0 MPa, or 3.5 MPa to 6.0 MPa, or 4.0 MPa to 6.0 MPa, or 2.0 MPa to 5.5 MPa, or 2.5 MPa to 5.5 MPa, or 3.0 MPa to 5.5 MPa, or 3.5 MPa to 5.5 MPa, or 4.0 MPa to 5.5 MPa, or 2.0 MPa to 5.0 MPa, or 2.5 MPa to 5.0 MPa, or 3.0 MPa to 5.0 MPa, or 3.5 MPa to 5.0 MPa, or 4.0 MPa to 5.0 MPa) over a frequency of 1-10 kHz.

Embodiment 17. The set acoustic adhesive composition of any of Embodiments 1-16 having a loss modulus at 20° C. of at least 3.0 MPa (e.g., at least 3.5 MPa, or at least 4.0 MPa, or at least 4.5 MPa) over a frequency of 1-10 kHz.

Embodiment 18. The set acoustic adhesive composition of any of Embodiments 1-16 having a loss modulus at 20° C. in the range of 3.0 MPa to 7.0 MPa (e.g., in the range of 3.5 MPa to 7.0 MPa, or 4.0 MPa to 7.0 MPa, or 4.5 MPa to 7.0 MPa, or 3.0 MPa to 6.5 MPa, or 3.5 MPa to 6.5 MPa, or 4.0 MPa to 6.5 MPa, or 4.5 MPa to 6.5 MPa, or 3.0 MPa to 6.0 MPa, or 3.5 MPa to 6.0 MPa, or 4.0 MPa to 6.0 MPa, or 4.5 MPa to 6.0 MPa) over a frequency of 1-10 kHz.

Embodiment 19. The set acoustic adhesive composition of any of Embodiments 1-18, wherein the set acoustic adhesive composition has a Tan δ height of at least 1 in the frequency range of 0.1-10 kHz.

Embodiment 20. The set acoustic adhesive composition of any of Embodiments 1-18, wherein the set acoustic adhesive composition has a Tan δ height of at least 1 in the frequency range of 1-8 kHz.

Embodiment 21. The set acoustic adhesive composition of any of Embodiments 1-18, wherein the set acoustic adhesive composition has a Tan δ height of at least 1 in the frequency range of 1-4 kHz.

Embodiment 22. The set acoustic adhesive composition of any of Embodiments 1-18, wherein the set acoustic adhesive composition has a Tan δ height in the range of 1-2 in the frequency range of 0.1-10 kHz.

Embodiment 23. The set acoustic adhesive composition of any of Embodiments 1-18, wherein the set acoustic adhesive composition has a Tan δ height in the range of 1-2 in the frequency range of 1-8 kHz.

Embodiment 24. The set acoustic adhesive composition of any of Embodiments 1-18, wherein the set acoustic adhesive composition has a Tan δ height in the range of 1-2 in the frequency range of 1-4 kHz.

Embodiment 25. The set acoustic adhesive composition of any of Embodiments 1-24, wherein the continuous phase of the viscoelastic material is present in an amount in the range of 65-95 wt % (e.g., in the range of 70-95 wt %, or 75-95 wt %, or 80-95 wt %) of the set acoustic adhesive composition.

Embodiment 26. The set acoustic adhesive composition of any of Embodiments 1-24, wherein the continuous phase of the viscoelastic material is present in an amount in the range of 60-90 wt % (e.g., in the range of 65-90 wt %, or 70-90 wt %, or 80-90 wt %) of the set acoustic adhesive composition.

Embodiment 27. The set acoustic adhesive composition of any of Embodiments 1-24, wherein the continuous phase of the viscoelastic material is present in an amount in the range of 60-85 wt % (e.g., in the range of 65-85 wt %, or 70-85 wt %, or 75-85 wt %, or 60-80 wt %, or 65-80 wt %, or 70-80 wt %, or 75-80 wt %) of the set acoustic adhesive composition.

Embodiment 28. The set acoustic adhesive composition of any of Embodiments 1-27, wherein the continuous phase of the viscoelastic material comprises a elastomeric polymer such as an acrylic polymer (e.g., derived from a latex).

Embodiment 29. The set acoustic adhesive composition of Embodiment 28, wherein the elastomeric (e.g., acrylic) polymer is present in an amount of at least 50 wt % of the continuous phase of the viscoelastic material.

Embodiment 30. The set acoustic adhesive composition of Embodiment 28, wherein the elastomeric (e.g., acrylic) polymer is present in an amount of at least 80 wt % (e.g., at least 85 wt %, or at least 90 wt %) of the continuous phase of the viscoelastic material.

Embodiment 31. The set acoustic adhesive composition of Embodiment 28, wherein the elastomeric (e.g., acrylic) polymer is present in an amount in the range of 50-99 wt % of the continuous phase of the viscoelastic material, e.g., 80-99 wt %, or 85-99 wt %, or 90-99 wt %, or 50-98 wt %, or 80-98 wt %, or 85-98 wt %, or 90-98 wt %, or 50-95 wt %, or 80-95 wt %, or 85-95 wt %, or 50-90 wt %, or 80-90 wt %, or 50-80 wt %, or 50-70 wt %.

Embodiment 32. The set acoustic adhesive composition of any of Embodiments 29-31, wherein the elastomeric (e.g., acrylic) polymer has a glass transition temperature of no greater than −10° C. (e.g., no greater than −20° C., no greater than 25° C., or no greater than −30° C.).

Embodiment 33. The set acoustic adhesive composition of any of Embodiments 29-31, wherein the elastomeric (e.g., acrylic) polymer has a glass transition temperature in the range of −70 to −20° C. (e.g., in the range of −65 to −20° C., or −60 to −20° C., or −70 to −25° C., or −65 to −25° C., or −60 to −25° C., or −70 to −30° C., or −65 to −30° C., or −60 to −30° C.).

Embodiment 34. The set acoustic adhesive composition of any of Embodiments 1-33, wherein the continuous phase of the viscoelastic material further comprises a tackifier.

Embodiment 35. The set acoustic adhesive composition of Embodiment 34, wherein the tackifier is present in an amount in the range of 1-20 wt % (e.g., in the range of 1-15 wt %, or 1-10 wt %, or 5-20 wt %, or 5-15 wt %, or 5-10 wt %, or 10-20 wt %, or 10-15 wt %) of the set acoustic adhesive composition.

Embodiment 36. The set acoustic adhesive composition of Embodiment 34 or Embodiment 35, wherein the tackifier is a rosin ester-based tackifier.

Embodiment 37. The set acoustic adhesive composition of any of Embodiments 1-36, wherein the continuous phase of the viscoelastic material further comprises a rheology modifier.

Embodiment 38. The set acoustic adhesive composition of Embodiment 37, wherein the rheology modifier is present in an amount in the range of 0.1-2 wt % (e.g., in the range of 0.2-2 wt %, or 0.2-1.5 wt %, or 0.2-1 wt %, 0.5-2 wt %, or 0.5-1.5 wt %, or 0.5-1 wt %) of the set acoustic adhesive composition.

Embodiment 39. The set acoustic adhesive composition of Embodiment 37 or Embodiment 38, wherein the rheology modifier is a hydrophobically-modified alkali-swellable associative thickener and/or a cellulosic thickener.

Embodiment 40. The set acoustic adhesive composition of any of Embodiments 1-39, wherein the continuous phase of viscoelastic material is not substantially cross-linked.

Embodiment 41. The set acoustic adhesive composition of any of Embodiments 1-39, wherein the particulate polymer filler is present in an amount in the range of 5-35 wt % (e.g., in the range of 5-30 wt %, or 5-25 wt %, or 5-20 wt %) of the set acoustic adhesive composition.

Embodiment 42. The set acoustic adhesive composition of any of Embodiments 1-39, wherein the particulate polymer filler is present in an amount in the range of 10-40 wt % (e.g., in the range of 10-35 wt %, or 10-30 wt %, or 10-25 wt %, or 10-20 wt % of the set acoustic adhesive composition.

Embodiment 43. The set acoustic adhesive composition of any of Embodiments 1-39, wherein the particulate polymer filler is present in an amount in the range of 15-40 wt % (e.g., in the range of 15-35 wt %, or 15-35 wt %, or 15-30 wt %, or 15-25 wt %) of the set acoustic adhesive composition.

Embodiment 44. The set acoustic adhesive composition of any of Embodiments 1-39, wherein the particulate polymer filler is present in an amount in the range of 20-40 wt % (e.g., in the range of 20-35 wt %, wo-30 wt %, or 20-25 wt %) of the set acoustic adhesive composition.

Embodiment 45. The acoustic adhesive composition of any of Embodiment 1-44, wherein the particulate polymer filler has a $d_{50}$ particle size of at least 50 nm (e.g., at least 75 nm, or at least 100 nm, or at least 125 nm).

Embodiment 46. The set acoustic adhesive composition of any of Embodiments 1-45, wherein the particulate polymer filler has a $d_{50}$ particle size in the range of 50-500 nm (e.g., in the range of 50-450 nm, or 50-400 nm, or 50-350 nm, or 50-300 nm, or 100-500 nm, or 100-450 nm, or 100-400 nm, or 100-350 nm, or 100-300 nm, or 150-500 nm, or 150-450 nm, or 150-400 nm, or 150-350 nm, or 150-300 nm).

Embodiment 47. The set acoustic adhesive composition of any of Embodiments 1-46, wherein the particulate polymer filler has $d_{10}$ value of at least 10 nm (e.g., at least 25 nm, or at least 50 nm); and a $d_{90}$ value of no more than 1000 nm (e.g., no more than 750 nm, or no more than 500 nm).

Embodiment 48. The set acoustic adhesive composition of any of Embodiments 1-47, wherein the particulate polymer filler has a density at 20° C. that is within 20% (e.g., within 15%, or within 10%) of a density at 20° C. of the continuous phase of viscoelastic material.

Embodiment 49. The set acoustic adhesive composition of any of Embodiment 1-48, wherein the particulate polymer filler is a styrene-based polymer, an acrylic-based polymer or an epoxy-based polymer, e.g., a styrene/butadiene polymer or a styrene/acrylic polymer.

Embodiment 50. The set acoustic adhesive composition of any of Embodiments 1-49, wherein the continuous phase of viscoelastic material and the particulate polymer filler together make up at least 90 wt % (e.g., at least 92 wt %, at least 95 wt %, or at least 99 wt %) of the set acoustic adhesive composition.

Embodiment 51. The set acoustic adhesive composition of any of Embodiments 1-50 comprising no more than 15 wt % of mineral filler (e.g., no more than 10 wt %, or no more than 5 wt %, or no more than 2 wt %, or no more than 1 wt %).

Embodiment 52. A liquid acoustic adhesive formulation, e.g., suitable for providing a set acoustic adhesive composition of any of Embodiments 1-51, the liquid acoustic adhesive formulation comprising an aqueous dispersion of:
  one or more components suitable to provide the continuous phase of viscoelastic material of the set acoustic adhesive composition, present in an amount in the range of 60-95 wt % on a dry solids basis; and
  the particulate polymer filler, in an amount in the range of 5-40 wt %, on a dry solids basis.

Embodiment 53. The liquid acoustic adhesive formulation of Embodiment 52, wherein the one or more components suitable to provide a continuous phase of a viscoelastic material are present in an amount as described in any of Embodiments 12-14, on a dry solids basis.

Embodiment 54. The liquid acoustic adhesive formulation of Embodiment 52 or Embodiment 53, wherein the continuous phase of viscoelastic material is as described in any of Embodiments 17-23.

Embodiment 55. The liquid acoustic adhesive formulation of any of Embodiments 52-54, wherein the one or more components include an acrylic polymer, e.g., in the form of a latex.

Embodiment 56. The liquid acoustic adhesive formulation of Embodiment 55, wherein the acrylic polymer is present in an amount of at least 80 wt % (e.g., at least 85 wt %, or at least 90 wt %) of the components that form the continuous phase of the viscoelastic material, on a dry solids basis.

Embodiment 57. The liquid acoustic adhesive formulation of Embodiment 55 or Embodiment 56, wherein the acrylic polymer is present in an amount of 32-90 wt % of the liquid acoustic adhesive formulation, on a dry solids basis.

Embodiment 58. The liquid acoustic adhesive formulation of any of Embodiments 52-57, further comprising a tackifier, for example, a rosin ester-based tackifier.

Embodiment 59. The liquid acoustic adhesive formulation of Embodiment 58, wherein the tackifier is present in an amount as described above with respect to Embodiment 33, on a dry solids basis.

Embodiment 60. The set acoustic adhesive formulation of any of Embodiments 52-59, further comprising a rheology modifier, for example, a hydrophobically-modified alkali-swellable associative thickener and/or a cellulosic thickener.

Embodiment 61. The liquid acoustic adhesive formulation of Embodiment 60, wherein the rheology modifier is present in an amount as described above with respect to Embodiment 36, on a dry solids basis.

Embodiment 62. The liquid acoustic adhesive formulation of any of Embodiments 52-58, wherein the particulate polymer filler is present in the liquid acoustic adhesive formulation in an amount as described in any of Embodiments 41-44, on a dry solids basis.

Embodiment 63. The liquid acoustic adhesive formulation of any of Embodiments 52-62, wherein the particulate polymer filler is as described in any of Embodiments 45-50.

Embodiment 64. The liquid acoustic adhesive formulation of any of Embodiments 52-63, wherein the one or more components suitable to provide the continuous phase of viscoelastic material and the particulate polymer filler together make up at least 90 wt % (e.g., at least 92 wt %, at least 95 wt %, or at least 99 wt %) of the liquid acoustic adhesive formulation, on a dry solids basis.

Embodiment 65. The liquid acoustic adhesive formulation of any of Embodiments 52-64, comprising no more than 15 wt % of mineral filler (e.g., no more than 10 wt %, or no more than 5 wt %, or no more than 2 wt %, or no more than 1 wt %), on a dry solids basis.

Embodiment 66. The liquid acoustic adhesive formulation of any of Embodiments 52-65, having a solids content in the range of 40-70 wt % (e.g., in the range of 45-70 wt %, or 50-70 wt %, or 55-70 wt %, or 40-65 wt %, or 45-65 wt %, or 50-65 wt %, or 55-65 wt %, or 40-60 wt %, or 45-60 wt %, or 50-60 wt %, or 55-60 wt %).

Embodiment 67. The liquid acoustic adhesive formulation of any of Embodiments 52-66, wherein the one or more components suitable to provide the continuous phase of the viscoelastic material has a wet density of at least 8 lbs/gal (e.g., at least 9 lbs/gal, or at least 10 lbs/gal, or at least 11 lbs/gal, or at least 12 lbs/gal).

Embodiment 68. The liquid acoustic adhesive formulation of any of Embodiments 52-67, comprising no more than 5 wt % of volatile organic liquid (e.g., no more than 2 wt %, no more than 1 wt %, or no more than 0.5 wt %).

Embodiment 69. The liquid acoustic adhesive formulation of any of Embodiments 52-68, having a pH in the range of 7-12 (e.g., in the range of 7-11.5, or 7-11, or 7-10.5, or 7-10, or 8-12, or 8-11.5, or 8-11, or 8-10.5, or 8-10, or 8.5-12, or 8.5-11.5, or 8.5-11, or 8.5-10.5, or 8.5-10, or 9-12, or 9-11.5, or 9-11, or 9-10.5, or 9-10).

Embodiment 70. The liquid acoustic adhesive formulation of any of Embodiments 52-69, wherein the one or more components suitable to provide the continuous phase of the viscoelastic material further comprises a basic pH modifier.

Embodiment 71. The liquid acoustic adhesive formulation of Embodiment 70, wherein the basic pH modifier is selected from sodium bicarbonate, potassium bicarbonate, or calcium carbonate.

Embodiment 72. The liquid acoustic adhesive formulation of any of Embodiments 52-71, wherein the liquid acoustic adhesive formulation has a viscosity of greater than 10 Pa-s over a shear rate of 0.1-100 s$^{-1}$.

Embodiment 73. The liquid acoustic adhesive formulation of any of Embodiments 52-71, wherein the liquid acoustic adhesive formulation has a viscosity in the range of 10-10,000 Pa-s over a shear rate of 0.1-100 s$^{-1}$.

Embodiment 74. A sound-dampening building board comprising:
a first plaster layer having a top surface and a bottom surface;
a second plaster layer having a top surface and a bottom surface; and
the set acoustic adhesive composition of any of Embodiments 1-51 disposed between the top surface of the first plaster layer and the bottom surface of the second plaster layer.

Embodiment 75. The sound-dampening building board of Embodiment 74, wherein the first plaster layer has a thickness in the range of ¼"-½".

Embodiment 76. The sound-dampening building board of Embodiment 74 or Embodiment 75, wherein the second plaster layer has a thickness in the range of ¼"-½".

Embodiment 77. The sound-dampening building board of Embodiments 74-76, wherein the thickness of the first plaster layer is equal to the thickness of the second plaster layer.

Embodiment 78. The sound-dampening building board of Embodiments 74-76, wherein the thickness of the first plaster layer is not equal to the thickness of the second plaster layer.

Embodiment 79. The sound-dampening building board of any of Embodiments 74-78, wherein the set acoustic adhesive composition has a thickness of in the range of 100 to 500 μm (e.g., in the range of 150 to 500 μm, or 150 to 450 μm, or 150 to 400 μm, or 150 to 350 μm, or 150 to 300 μm, or 200 to 500 μm, or 200 to 450 μm, or 200 to 400 μm, or 200 to 350 μm, or 200 to 300 μm).

Embodiment 80. The sound-dampening building board of any of Embodiments 74-79, wherein the sound-dampening building board has a thickness in the range of ⅜" to 1).

Embodiment 81. The sound-dampening building board of any of Embodiments 74-80, wherein the sound dampening building board has a loss factor of at least 10% at a frequency in the range of 175-225 Hz.

Embodiment 82. The sound-dampening building board of Embodiments 74-80, wherein the sound dampening building board has a loss factor in the range of 10-18% at a frequency in the range of 175-225 Hz.

Embodiment 83. The sound-dampening building board of any of Embodiments 74-82, wherein the sound damp-ening building board has a loss factor of at least 12% at a frequency in the range of 800-1000 Hz.

Embodiment 84. The sound-dampening building board of any of Embodiments 74-82, wherein the sound damp-ening building board has a loss factor in the range of 12-20% at a frequency in the range of 800-1000 Hz.

Embodiment 85. The sound-dampening building board of any of Embodiments 74-84, wherein the sound damp-ening building board has a loss factor of at least 16% at a frequency in the range of 2000-2500 Hz.

Embodiment 86. The sound-dampening building board of any of Embodiments 74-84, wherein the sound damp-ening building board has a loss factor in the range of 16-24% at a frequency in the range of 2000-2500 Hz.

Embodiment 87. A method for making the sound-damp-ening building board of any of Embodiments 74-86 comprising:

providing the first plaster layer having a top surface and a bottom surface and the second plaster layer having a top surface and a bottom surface;

disposing the liquid acoustic adhesive formulation as described herein between the top surface of the first plaster layer and the bottom surface of the second plaster layer; and allowing the liquid acoustic adhesive formulation to set to provide the set acoustic adhesive composition.

Embodiment 88. The method of Embodiment 87, wherein the allowing the liquid acoustic adhesive formulation to set includes heating at a temperature in the range 50-350° C.

Embodiment 89. The method of Embodiment 88, wherein the heating occurs for a time in the range of 30 minutes to 3 hours.

The particulars shown herein are by way of example and for purposes of illustrative discussion of the preferred embodiments of the present disclosure only and are pre-sented in the cause of providing what is believed to be the most useful and readily understood description of the prin-ciples and conceptual aspects of various embodiments of the disclosure. In this regard, no attempt is made to show structural details of the disclosure in more detail than is necessary for the fundamental understanding of the disclo-sure, the description taken with the drawings and/or examples making apparent to those skilled in the art how the several forms of the disclosure may be embodied in practice. Thus, before the disclosed processes and devices are described, it is to be understood that the aspects described herein are not limited to specific embodiments, apparatuses, or configurations, and as such can, of course, vary. It is also to be understood that the terminology used herein is for the purpose of describing particular aspects only and, unless specifically defined herein, is not intended to be limiting.

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the speci-fication as if it were individually recited herein. It will be further understood that the endpoints of each of the ranges are significant both in relation to the other endpoint, and independently of the other endpoint.

All methods described herein can be performed in any suitable order of steps unless otherwise indicated herein or otherwise clearly contradicted by context. The use of any and all examples, or exemplary language (e.g., "such as") provided herein is intended merely to better illuminate the disclosure and does not pose a limitation on the scope of the disclosure otherwise claimed. No language in the specifica-tion should be construed as indicating any non-claimed element essential to the practice of the disclosure.

Unless the context clearly requires otherwise, throughout the description and the claims, the words 'comprise', 'com-prising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the appli-cation.

As will be understood by one of ordinary skill in the art, each embodiment disclosed herein can comprise, consist essentially of or consist of its particular stated element, step, ingredient or component. As used herein, the transition term "comprise" or "comprises" means includes, but is not lim-ited to, and allows for the inclusion of unspecified elements, steps, ingredients, or components, even in major amounts. The transitional phrase "consisting of" excludes any ele-ment, step, ingredient or component not specified. The transition phrase "consisting essentially of" limits the scope of the embodiment to the specified elements, steps, ingre-dients or components and to those that do not materially affect the embodiment.

Unless indicated to the contrary, the numerical parameters set forth in the specification and attached claims are approxi-mations that may vary depending upon the desired proper-ties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and param-eters setting forth the broad scope of the disclosure are approximations, the numerical values set forth in the specific examples are reported as precisely as possible. Any numeri-cal value, however, inherently contains certain errors nec-essarily resulting from the standard deviation found in their respective testing measurements.

Groupings of alternative elements or embodiments of the disclosure disclosed herein are not to be construed as limitations. Each group member may be referred to and claimed individually or in any combination with other members of the group or other elements found herein. It is anticipated that one or more members of a group may be included in, or deleted from, a group for reasons of conve-nience and/or patentability. When any such inclusion or deletion occurs, the specification is deemed to contain the group as modified thus fulfilling the written description of all Markush groups used in the appended claims.

Some embodiments of this disclosure are described herein, including the best mode known to the inventors for carrying out the disclosure. Of course, variations on these described embodiments will become apparent to those of ordinary skill in the art upon reading the foregoing description. The inventor expects skilled artisans to employ such variations as appropriate, and the inventors intend for the disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Furthermore, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

We claim:

1. A set acoustic adhesive composition having a storage modulus at 20° C. of at least 2.0 MPa at 20° C. over a frequency of 1-10 kHz, the set acoustic adhesive composition comprising:

a continuous phase of a viscoelastic material present in an amount in the range of 60-95 wt % of the set acoustic adhesive composition; and dispersed in the continuous phase, a particulate polymer filler present in an amount in the range of 5-40 wt % of the set acoustic adhesive composition, wherein:

the particulate polymer filler has a storage modulus at 20° C. of at least 50 times a storage modulus at 20° C. of the continuous phase at 20° C., over a frequency of 1-10 KHz; and/or the viscoelastic material of the continuous phase has a glass transition temperature ($T_g$) no greater than 0° C., and the particulate polymer filler has a glass transition temperature ($T_g$) of at least 60° C.

2. The set set acoustic adhesive composition according to claim 1, wherein the particulate polymer filler has a storage modulus at 20° C. of at least 50 times a storage modulus at 20° C. of the continuous phase at 20° C., over a frequency of 1-10 KHz.

3. The set set acoustic adhesive composition according to claim 1, wherein the particulate polymer filler has a storage modulus at 20° C. that is at least $10^3$ times a storage modulus at 20° C. over a frequency of 1-10 KHz of the continuous phase of the viscoelastic material.

4. The set set acoustic adhesive composition according to claim 1, wherein the particulate polymer filler has a storage modulus at 20° C. over a frequency of 1-10 kHz of at least 1000 MPa over a frequency of 1-10 kHz, and the continuous phase of the viscoelastic material has a storage modulus at 20° C. of no more than 1 MPa over a frequency of 1-10 KHz.

5. The set acoustic adhesive composition according to claim 1, wherein the viscoelastic material of the continuous phase has a glass transition temperature (Tg) no greater than 0° C., and the particulate polymer filler has a glass transition temperature (Tg) of at least 60° C.

6. The set acoustic adhesive composition according to claim 1, wherein the viscoelastic material of the continuous phase lacks a glass transition temperature ($T_g$) greater than 20° C.

7. The set acoustic adhesive composition according to claim 1, wherein the continuous phase of the viscoelastic material has a glass transition temperature ($T_g$) no greater than −15° C., and the particulate polymer filler has a glass transition temperature ($T_g$) of at least 80° C.

8. The set acoustic adhesive composition according to claim 1, wherein the particulate polymer filler lacks a glass transition temperature ($T_g$) less than 40° C.

9. The set acoustic adhesive composition according to claim 1, having a storage modulus at 20° C. of at least 4.0 MPa, and a loss modulus at 20° C. of at least 4.5 MPa over a frequency of 1-10 KHz, and a Tan δ height of at least 1 in the frequency range of 0.1-10 KHz.

10. The set acoustic adhesive composition according to claim 1, wherein the continuous phase of the viscoelastic material comprises a an acrylic elastomeric polymer, present in an amount of at least 80 wt % of the continuous phase of the viscoelastic material.

11. The set acoustic adhesive composition according to claim 1, wherein the continuous phase of the viscoelastic material further comprises a tackifier present in an amount in the range of 1-15 wt % of the set acoustic adhesive composition, and a rheology modifier that is a is a hydrophobically-modified alkali-swellable associative thickener and/or a cellulosic thickener, present in an amount in the range of 0.1-2 wt % of the set acoustic adhesive composition.

12. The set acoustic adhesive composition according to claim 1, wherein the continuous phase of viscoelastic material is not substantially crosslinked.

13. The set acoustic adhesive composition according to claim 1, wherein the particulate polymer filler is present in an amount in the range of 15-40 wt % of the set acoustic adhesive composition.

14. The set acoustic adhesive composition according to claim 1, wherein the particulate polymer filler has a $d_{50}$ particle size in the range of 50-500 nm.

15. The set acoustic adhesive composition according to claim 1, wherein the particulate polymer filler is a styrene-based polymer, an acrylic-based polymer or an epoxy-based polymer, e.g., a styrene/butadiene polymer or a styrene/acrylic polymer.

16. The set acoustic adhesive composition according to claim 1, wherein the continuous phase of viscoelastic material and the particulate polymer filler together make up at least 90 wt % of the set acoustic adhesive composition.

17. The set acoustic adhesive composition according to claim 1, comprising no more than 5 wt % of mineral filler.

18. The set acoustic adhesive composition according to claim 1, wherein the particulate polymer filler has a storage modulus at 20° C. of at least 50 times a storage modulus at 20° C. of the continuous phase at 20° C., over a frequency of 1-10 KHz; and the viscoelastic material of the continuous phase has a glass transition temperature ($T_g$) no greater than 0° C., and the particulate polymer filler has a glass transition temperature ($T_g$) of at least 60° C.; and wherein the viscoelastic material of the continuous phase lacks a glass transition temperature ($T_g$) greater than 20° C.;

the particulate polymer filler lacks a glass transition temperature ($T_g$) less than 40° C.; and the continuous phase of the viscoelastic material further comprises a tackifier present in an amount in the range of 1-15 wt % of the set acoustic adhesive composition, and a rheology modifier that is a is a hydrophobically-modified alkali-swellable associative thickener and/or a cellulosic thickener, present in an amount in the range of 0.1-2 wt % of the set acoustic adhesive composition.

19. A liquid acoustic adhesive formulation, suitable for providing a set acoustic adhesive composition according to claim 1, the liquid acoustic adhesive formulation comprising an aqueous dispersion of:

one or more components suitable to provide the continuous phase of viscoelastic material of the set acoustic adhesive composition, present in an amount in the range of 60-95 wt % on a dry solids basis; and the particulate polymer filler, in an amount in the range of 5-40 wt %, on a dry solids basis.

20. A sound-dampening building board comprising:

a first plaster layer having a top surface and a bottom surface;

a second plaster layer having a top surface and a bottom surface; and the set acoustic adhesive composition of claim 1 disposed between the top surface of the first plaster layer and the bottom surface of the second plaster layer.

21. A sound-dampening building board comprising:

a first plaster layer having a top surface and a bottom surface;

a second plaster layer having a top surface and a bottom surface; and the set acoustic adhesive composition of claim 18 disposed between the top surface of the first plaster layer and the bottom surface of the second plaster layer.

\* \* \* \* \*